United States Patent
Lindberg et al.

(10) Patent No.: US 10,362,325 B2
(45) Date of Patent: *Jul. 23, 2019

(54) TECHNIQUES FOR COMPRESSING MULTIPLE-CHANNEL IMAGES

(71) Applicant: Apple Inc., Cupertino, CA (US)

(72) Inventors: Lars M. Lindberg, Bjaerred (SE); Paul S. Chang, San Jose, CA (US); Ali Sazegari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,891

(22) Filed: May 31, 2018

(65) Prior Publication Data

US 2018/0352243 A1 Dec. 6, 2018

Related U.S. Application Data

(63) Continuation-in-part of application No. 15/665,404, filed on Jul. 31, 2017.

(Continued)

(51) Int. Cl.
*H04N 19/46* (2014.01)
*H04N 19/184* (2014.01)
*H04N 19/182* (2014.01)
*H04N 19/60* (2014.01)
*H04N 19/186* (2014.01)
*H04N 19/61* (2014.01)
(Continued)

(52) U.S. Cl.
CPC .............. *H04N 19/46* (2014.11); *H04N 19/11* (2014.11); *H04N 19/154* (2014.11); *H04N 19/182* (2014.11); *H04N 19/184* (2014.11); *H04N 19/186* (2014.11); *H04N 19/60* (2014.11); *H04N 19/61* (2014.11); *H04N 19/88* (2014.11)

(58) Field of Classification Search
CPC .. H04N 1/32277; H04N 19/186; H04N 19/70; H04N 19/80; H04N 19/85; H04N 19/87
See application file for complete search history.

(56) References Cited

U.S. PATENT DOCUMENTS 7,693,339 B2 * 4/2010 Wittenstein ............ H04N 19/80
382/232
8,446,960 B2 5/2013 Marpe et al.
(Continued)

*Primary Examiner* — Bobbak Safaipour
(74) *Attorney, Agent, or Firm* — Dickinson Wright RLLP

(57) ABSTRACT

Disclosed are techniques for pre-processing an image for compression, e.g., one that includes a plurality of pixels, where each pixel is composed of sub-pixels that include at least an alpha sub-pixel. First, the alpha sub-pixels are separated into a first data stream. Next, invertible transformations are applied to the remaining sub-pixels to produce transformed sub-pixels. Next, for each row of the pixels: (i) identifying a predictive function that yields a smallest prediction differential total for the row, (ii) providing an identifier of the predictive function to a second data stream, and (iii) converting the transformed sub-pixels of the pixels in the row into prediction differentials based on the predictive function. Additionally, the prediction differentials for each of the pixels are encoded into first and second bytes that are provided to third and fourth data streams, respectively. In turn, the various data streams are compressed into a compressed image.

20 Claims, 19 Drawing Sheets

Related U.S. Application Data

(60) Provisional application No. 62/514,873, filed on Jun. 4, 2017.

(51) Int. Cl.
  *H04N 19/11* (2014.01)
  *H04N 19/154* (2014.01)
  *H04N 19/88* (2014.01)

(56) References Cited

U.S. PATENT DOCUMENTS

| | | | |
|---|---|---|---|
| 8,977,066 B2* | 3/2015 | Alakuijala | H04N 19/463 382/166 |
| 10,198,991 B2* | 2/2019 | Lindberg | G09G 3/3233 |
| 2005/0226518 A1* | 10/2005 | Suzuki | H04N 19/172 382/246 |
| 2005/0232504 A1* | 10/2005 | Suzuki | H04N 19/176 382/246 |
| 2009/0226084 A1 | 9/2009 | Courchesne et al. | |
| 2012/0183073 A1* | 7/2012 | Milstein | H04N 19/63 375/240.19 |
| 2014/0369614 A1 | 12/2014 | Fenney | |
| 2015/0264364 A1 | 9/2015 | Zhang et al. | |
| 2018/0048917 A1* | 2/2018 | Metzler | H04N 19/91 |
| 2018/0247589 A1* | 8/2018 | Lindberg | G09G 3/3233 |
| 2018/0249183 A1 | 8/2018 | Lindberg et al. | |

\* cited by examiner

Step 220 – Apply the following invertible transformation functions to each sub-pixel where appropriate to produce transformed sub-pixels:

Step 230 – Apply different predictive functions to each row of Y, Co, and Cg sub-pixels to identify a predictive function that yields the best prediction differentials across the row.

Step 240 – For each row of pixels, store the index for the predictive function that yields the lowest overall prediction differential across the row.

Step 602 – Apply the following invertible color space transformation functions to each sub-pixel where appropriate to produce transformed sub-pixels:

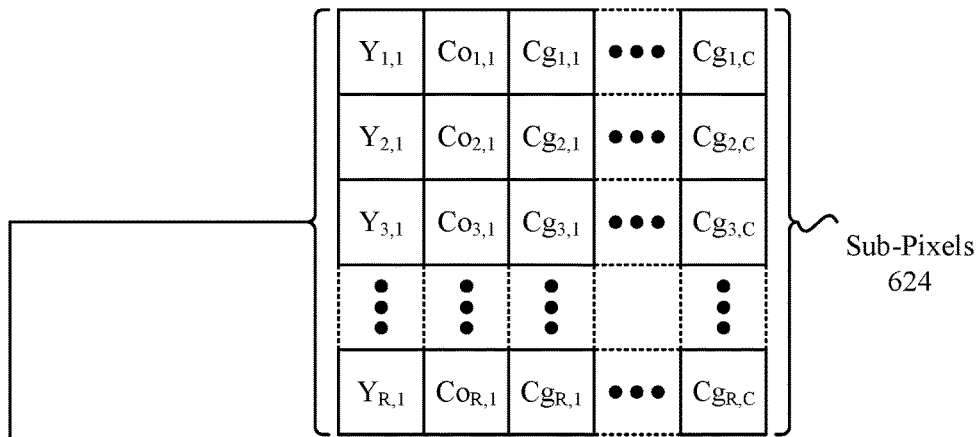

Step 603 – Apply the following spatial transformation functions to each transformed sub-pixel to produce further-transformed sub-pixels:

$$Y_{1,1} = \begin{cases} \text{DiffY} = Y_{1,2} - Y_{1,1} \\ \text{MeanY} = Y_{1,1} - (\text{DiffY} / 2) \end{cases}$$

$$Co_{1,1} = \begin{cases} \text{DiffCo} = Co_{1,2} - Co_{1,1} \\ \text{MeanCo} = Co_{1,1} - (\text{DiffCo} / 2) \end{cases}$$

$$Cg_{1,1} = \begin{cases} \text{DiffCg} = Cg_{1,2} - Cg_{1,1} \\ \text{MeanCg} = Cg_{1,1} - (\text{DiffCg} / 2) \end{cases}$$

Transformation Functions 626

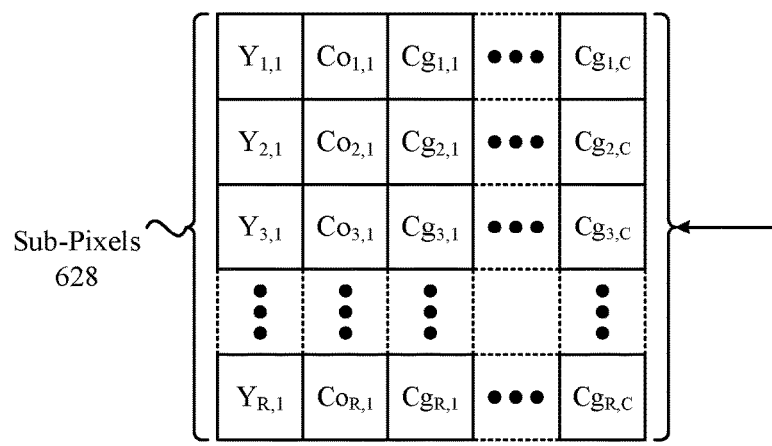

*FIG. 6C*

Step 604 – Quantize the further-transformed sub-pixels to produce quantized sub-pixels:

Step 605 – Transform the sub-pixels based on a palette representation:

Step 606 – Transform the sub-pixels based on identified symmetries:

Step 607 – Apply different predictive functions to each row of Y, Co, and Cg sub-pixels to identify a predictive function that yields the best prediction differentials across the row.

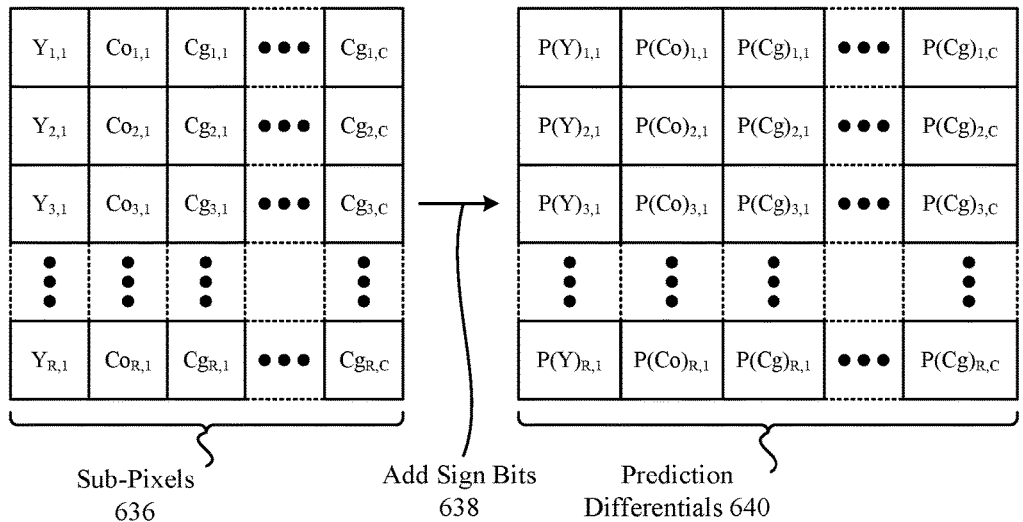

Sub-Pixels 636    Add Sign Bits 638    Prediction Differentials 640

Example: Applying different predictive functions to the second row of the Y sub-pixels:

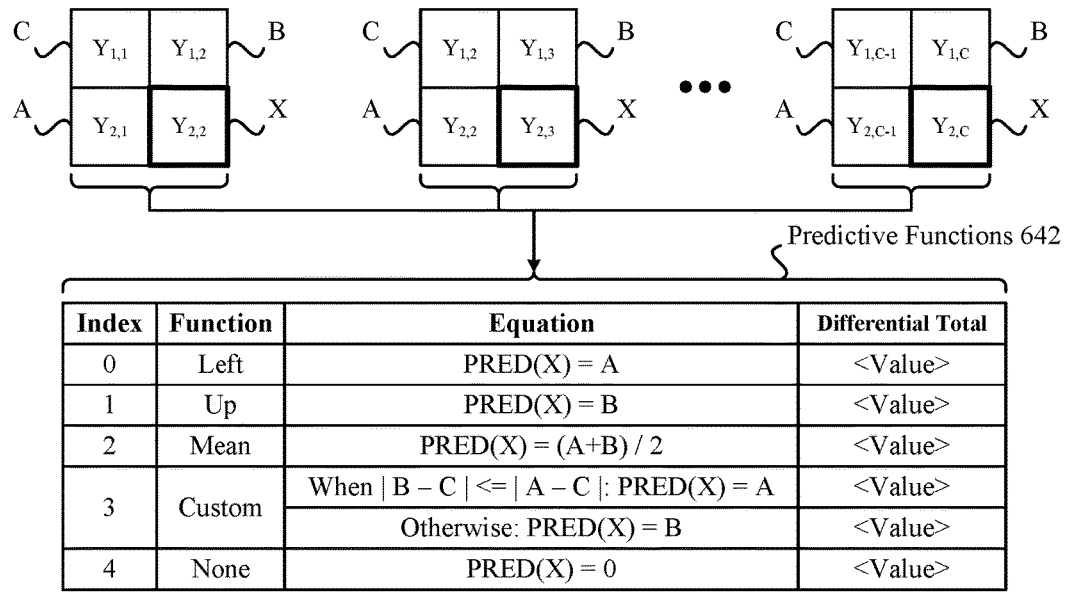

Predictive Functions 642

| Index | Function | Equation | Differential Total |
|---|---|---|---|
| 0 | Left | PRED(X) = A | <Value> |
| 1 | Up | PRED(X) = B | <Value> |
| 2 | Mean | PRED(X) = (A+B) / 2 | <Value> |
| 3 | Custom | When $\mid B - C \mid \leq \mid A - C \mid$: PRED(X) = A | <Value> |
|   |   | Otherwise: PRED(X) = B | <Value> |
| 4 | None | PRED(X) = 0 | <Value> |

*FIG. 6F*

Step 608 – For each row of pixels, store the index for the predictive function that yields the lowest overall prediction differential across the row.

TECHNIQUES FOR COMPRESSING MULTIPLE-CHANNEL IMAGES

CROSS-REFERENCE TO RELATED APPLICATIONS

The present application is a continuation-in-part of U.S. patent application Ser. No. 15/665,404, entitled "TECHNIQUES FOR COMPRESSING MULTIPLE-CHANNEL IMAGES," filed Jul. 31, 2017, and claims the benefit of U.S. Provisional Application No. 62/514,873, entitled "TECHNIQUES FOR COMPRESSING MULTIPLE-CHANNEL IMAGES," filed Jun. 4, 2017, the content of which is incorporated herein by reference in its entirety for all purposes.

FIELD OF INVENTION

The embodiments described herein set forth techniques for compressing multiple-channel images (e.g., red, green, blue, and alpha (RGBA) images). In particular, the techniques involve pre-processing the images (i.e., prior to compression) in a manner that can enhance resulting compression ratios when the images are compressed using lossless compressors (e.g., Lempel-Ziv-Welch (LZW)-based compressors).

BACKGROUND

Image compression techniques involve exploiting aspects of an image to reduce its overall size while retaining information that can be used to re-establish the image to its original (lossless) or near-original (lossy) form. Different parameters can be provided to compressors to achieve performance characteristics that best-fit particular environments. For example, higher compression ratios can be used to increase the amount of available storage space within computing devices (e.g., smart phones, tablets, wearables, etc.), but this typically comes at a cost of cycle-intensive compression procedures that consume correspondingly higher amounts of power and time. On the contrary, cycle-efficient compression techniques can reduce power consumption and latency, but this typically comes at a cost of correspondingly lower compression ratios and amounts of available storage space within computing devices.

Notably, new compression challenges are arising as computing device capabilities are enhanced over time. For example, computing devices can be configured (e.g., at a time of manufacture) to store thousands of images that are frequently-accessed by users of the computing devices. For example, a collection of emoticons can be stored at a given computing device, where it can be desirable to enable the collection of emoticons to be frequently-accessed with low computational overhead. Additionally, although average storage space availability is also being increased over time, it can still be desirable to reduce a size of the collection to increase the average storage space availability.

SUMMARY OF INVENTION

Representative embodiments set forth herein disclose techniques for compressing multiple-channel images (e.g., red, green, blue, and alpha (RGBA) images). In particular, the techniques involve pre-processing the images (i.e., prior to compression) in a manner that can enhance resulting compression ratios when the images are compressed using lossless compressors (e.g., Lempel-Ziv-Welch (LZW)-based compressors).

One embodiment sets forth a method for pre-processing a multiple-channel image for compression. According to some embodiments, the method can be implemented at a computing device, and can include a first step of receiving the multiple-channel image, where (i) the multiple-channel image comprises a plurality of pixels, and (ii) each pixel is composed of sub-pixels that include at least an alpha sub-pixel. A next step of the method can include separating the alpha sub-pixels into a first data stream. Next, the method includes applying invertible transformations to the remaining sub-pixels to produce transformed sub-pixels. Subsequently, the method includes carrying out the following steps for each row of the pixels: (i) identifying a predictive function (from a collection of predictive functions) that yields a most-desirable prediction differential total for the row of pixels, (ii) providing an identifier of the predictive function to a second data stream, and (iii) converting the transformed sub-pixels of the pixels in the row into prediction differentials based on the predictive function. Additionally, the method can include, for each of the pixels: (i) encoding the prediction differentials of the pixel into a first byte and a second byte, and (ii) providing the first and second bytes to third and fourth data streams, respectively. Finally, the method can include compressing the first, second, third, and fourth data streams to produce a compressed image.

According to some embodiments, the foregoing method can be expanded to include additional steps that are carried out subsequent to applying the above-described invertible transformations. In particular, the additional steps can include applying one or more of an invertible spatial transformation, a quantization transformation, an invertible color palette transformation, or an invertible symmetry transformation to the remaining sub-pixels of each pixel.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 6A-6H illustrate a sequence of conceptual diagrams for the expanded approach for pre-processing a multiple-channel image for compression, according to some embodiments.

DETAILED DESCRIPTION

Figure 1:
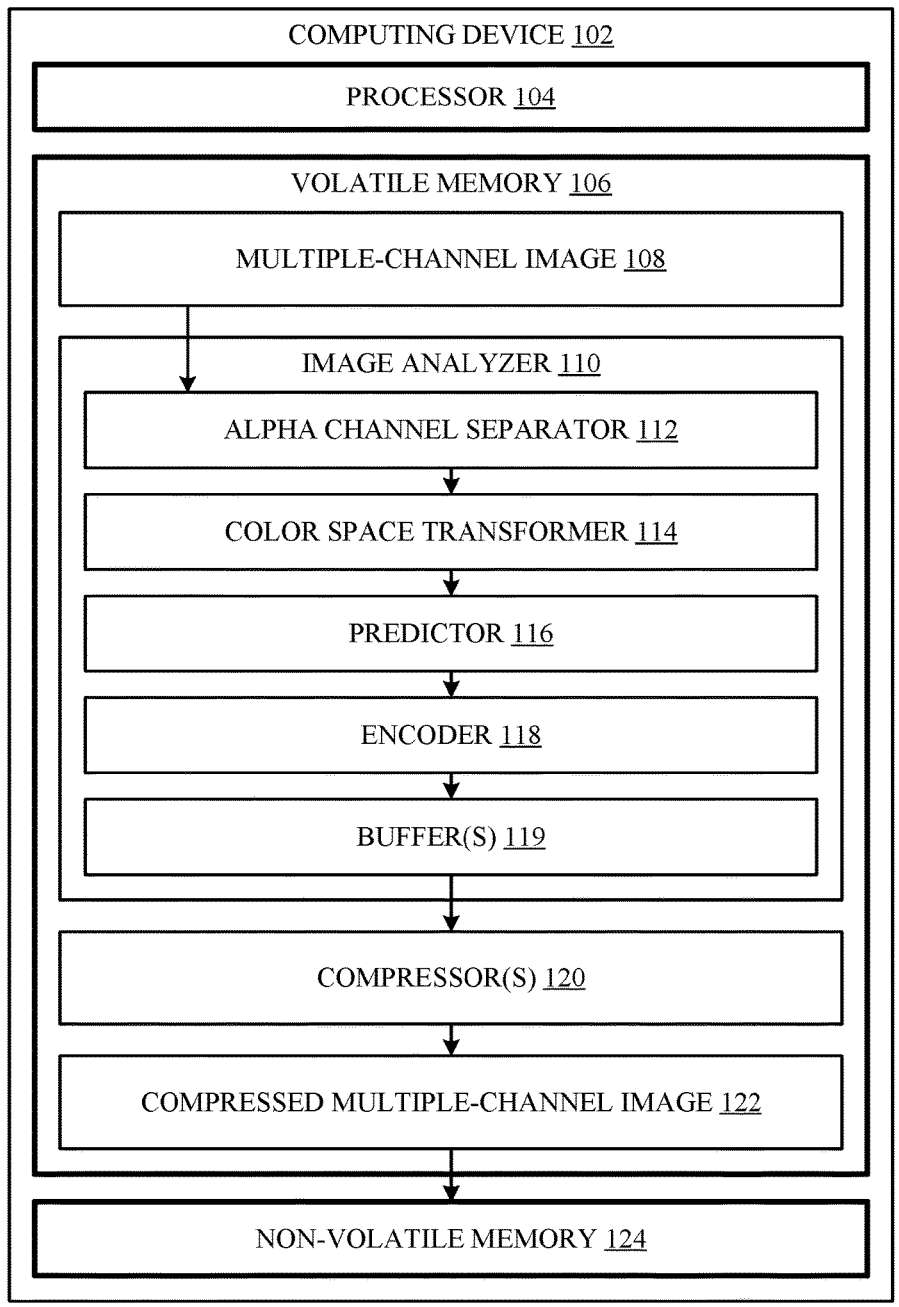
FIG. 1 illustrates an overview of a computing device that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Representative embodiments set forth herein disclose techniques for compressing multiple-channel images (e.g., red, green, blue, and alpha (RGBA) images). In particular, the techniques involve pre-processing the images (i.e., prior to compression) in a manner that can enhance resulting compression ratios when the images are compressed using lossless compressors (e.g., Lempel-Ziv-Welch (LZW)-based compressors).

One embodiment sets forth a method for pre-processing a multiple-channel image for compression. According to some embodiments, the method can be implemented at a computing device, and can include a first step of receiving the multiple-channel image, where the multiple-channel image comprises a plurality of pixels (e.g., arranged according to a row/column layout). According to some embodiments, each pixel is composed of sub-pixels that include at least an alpha sub-pixel. For example, each pixel can also include a red sub-pixel, a green sub-pixel, and a blue sub-pixel. A next step of the method can include separating the alpha sub-pixels into a first data stream (e.g., in a left to right (i.e., row-wise)/top down (i.e., column-wise) order across the pixels). Next, the method includes applying invertible transformations to the remaining sub-pixels (e.g., the red, green, and blue subpixels) to produce transformed sub-pixels. Subsequently, the method includes establishing a second data stream that will be used to store identifiers for different predictive functions that yield the best results for each row of the pixels. In particular, a next step of the method can involve carrying out the following steps for each row of the pixels: (i) identifying a predictive function that yields a most-desirable (e.g., a smallest) prediction differential total for the row of pixels, (ii) providing an identifier of the predictive function to the second data stream, and (iii) converting the transformed sub-pixels of the pixels in the row into prediction differentials based on the predictive function. Additionally, the method can involve establishing third and fourth data streams that will be used to store different portions of the prediction differentials of the pixels. In particular, a next step of the method can include, for each of the pixels: (i) encoding the prediction differentials of the pixel into a first byte and a second byte, and (ii) providing the first and second bytes to the third and fourth data streams, respectively. Finally, the method can include compressing the first, second, third, and fourth data streams to produce a compressed image.

Accordingly, the techniques set forth herein involve pre-processing the images (i.e., prior to compression) in a manner that can enhance resulting compression ratios when the images are compressed using lossless compressors (e.g., Lempel-Ziv-Welch (LZW)-based compressors). A more detailed description of these techniques is provided below in conjunction with FIGS. 1, 2A-2E, and 3-4.

Figure 4:
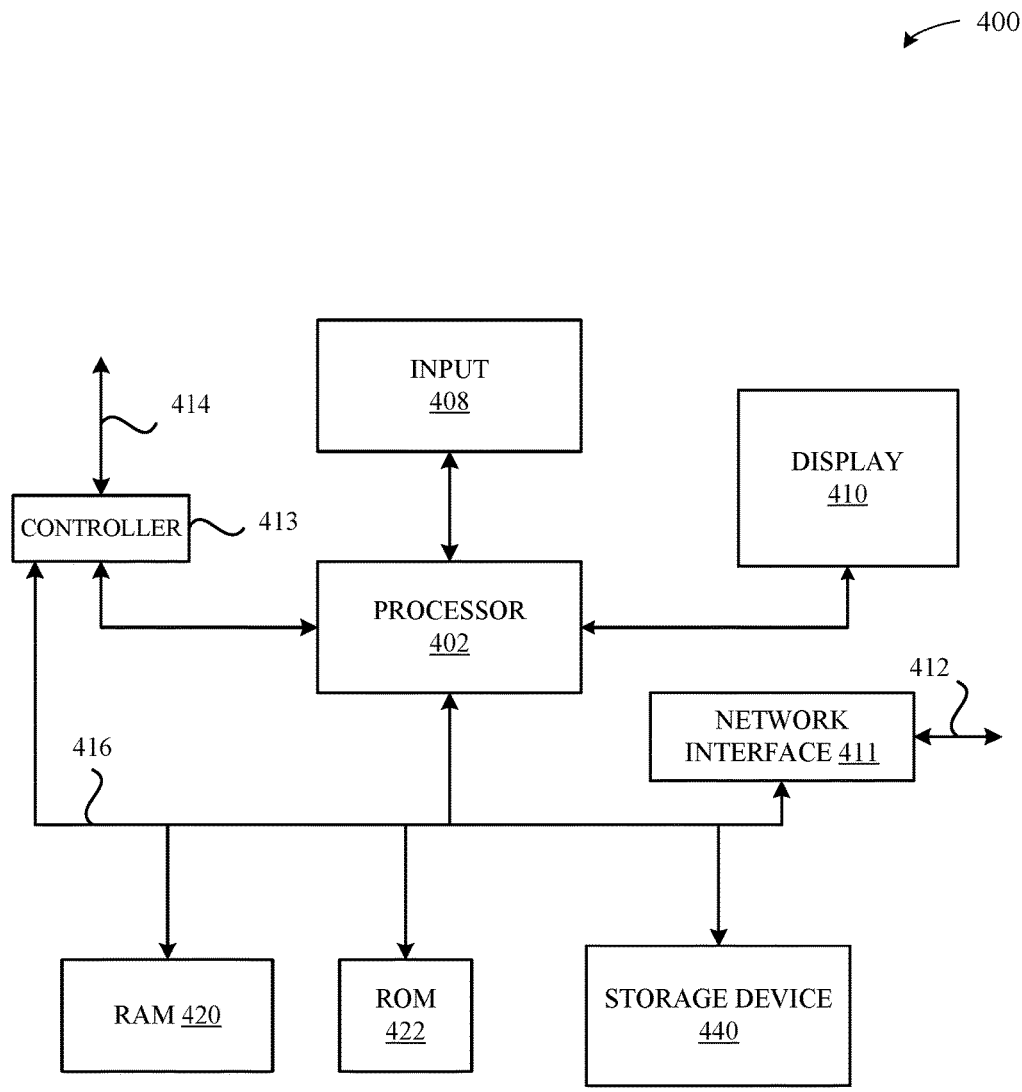
FIG. 4 illustrates a detailed view of a computing device that can be used to implement the various techniques described herein, according to some embodiments.

FIG. 1 illustrates an overview 100 of a computing device 102 that can be configured to perform the various techniques described herein. As shown in FIG. 1, the computing device 102 can include a processor 104, a volatile memory 106, and a non-volatile memory 124. It is noted that a more detailed breakdown of example hardware components that can be included in the computing device 102 is illustrated in FIG. 4, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) (not illustrated in FIG. 1) can be loaded into the volatile memory 106, where the OS can execute a variety of applications that collectively enable the various techniques described herein to be implemented. For example, these applications can include an image analyzer 110 (and its internal components), one or more compressors 120, and so on.

According to some embodiments, the image analyzer 110 can be configured to implement the techniques described herein that involve pre-processing multiple-channel images 108 prior to compressing the multiple-channel images 108. For example, a multiple-channel image 108 can represent a red, green, blue, and alpha (RGBA) image (e.g., an image of an emoticon). However, it is noted the techniques described herein can be applied to any multiple-channel image 108 where compression enhancements can be afforded. For example, the techniques can be applied to multiple-channel images 108 having different resolutions, layouts, bit-lengths, and so on (compared to those described herein) without departing from the scope of this disclosure. It is noted that FIGS. 2A-2E and 3 (and the corresponding descriptions set forth below) provide a more detailed breakdown of the functionality of the image analyzer 110, and that the following description of the image analyzer 110 with respect to FIG. 1 is provided at a high level for simplification purposes.

As shown in FIG. 1, the multiple-channel image 108 is received by the image analyzer 110. According to some embodiments, and as described in greater detail herein, the multiple-channel image 108 can be composed of a collection of pixels, where each pixel in the collection of pixels includes a group of sub-pixels (e.g., a red sub-pixel, a green sub-pixel, a blue sub-pixel, an alpha sub-pixel, etc.). It is noted that the term "sub-pixel" used herein can be synonymous with the term "channel." Upon receipt of the multiple-channel image 108, an alpha channel separator 112 can be configured to (i) extract the alpha sub-pixels from the collection of pixels, and (ii) store them into an alpha channel data stream, which is described below in greater detail in conjunction with FIG. 2A.

Next, the remaining sub-pixels (e.g., the red, green, and blue sub-pixels) are provided to a color space transformer 114, a predictor 116, and an encoder 118, to perform a series of operations prior to compression. For example, the color space transformer 114 can be configured to apply an invertible transformation to the sub-pixels of each pixel to produce an equal number of transformed sub-pixel values, which is described below in greater detail in conjunction with FIG. 2B. Next, the predictor 116 can identify a predictive function (e.g., from among a group of available predictive functions) that yields the most desirable (e.g., the most accurate) results for each row of the transformed sub-pixel values, which is described below in greater detail in conjunction with FIGS. 2C-2D. In particular, the predictor 116 can store, into a predictive function data stream, an indication of the respective predictive functions identified/selected for the rows of pixels. Additionally, the predictor 116 can apply the respective identified predictive functions to the rows of the transformed sub-pixel values to produce prediction differentials (i.e., prediction errors relative to the value of the transformed sub-pixels). Subsequently, the encoder 118 can distribute the bits (i.e., binary values) of the prediction differentials into two corresponding bytes, which is described below in greater detail in conjunction with FIG. 2E. Additionally, the encoder 118 can place the two corresponding bytes (for each respective pixel) into buffer(s) 119. In turn, the compressor(s) 120 can take action and compress the buffer(s) 119, which is also described below in greater detail in conjunction with FIG. 2E. Finally, the output(s) of the compressor(s) 120 can be joined together to produce a compressed multiple-channel image 122, which is also described below in greater detail in conjunction with FIG. 2E.

Notably, and according to some embodiments, the compressor(s) 120 can be configured to implement one or more compression techniques for compressing the buffer(s) 119. For example, the compressors 120 can implement Lempel-Ziv-Welch (LZW)-based compressors, other types of compressors, combinations of compressors, and so on. Moreover, the compressor(s) 120 can be implemented in any manner to establish an environment that is most-efficient for compressing the buffer(s) 119. For example, multiple buffers 119 can be instantiated (where pixels can be pre-processed in parallel), and each buffer 119 can be tied to a respective compressor 120 such that the buffers 119 can be simultaneously compressed in parallel as well. Moreover, the same or a different type of compressor 120 can be tied to each of the buffer(s) 119 based on the formatting of the data that is placed into the buffer(s) 119.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2E and 3-4.

Figure 2A:
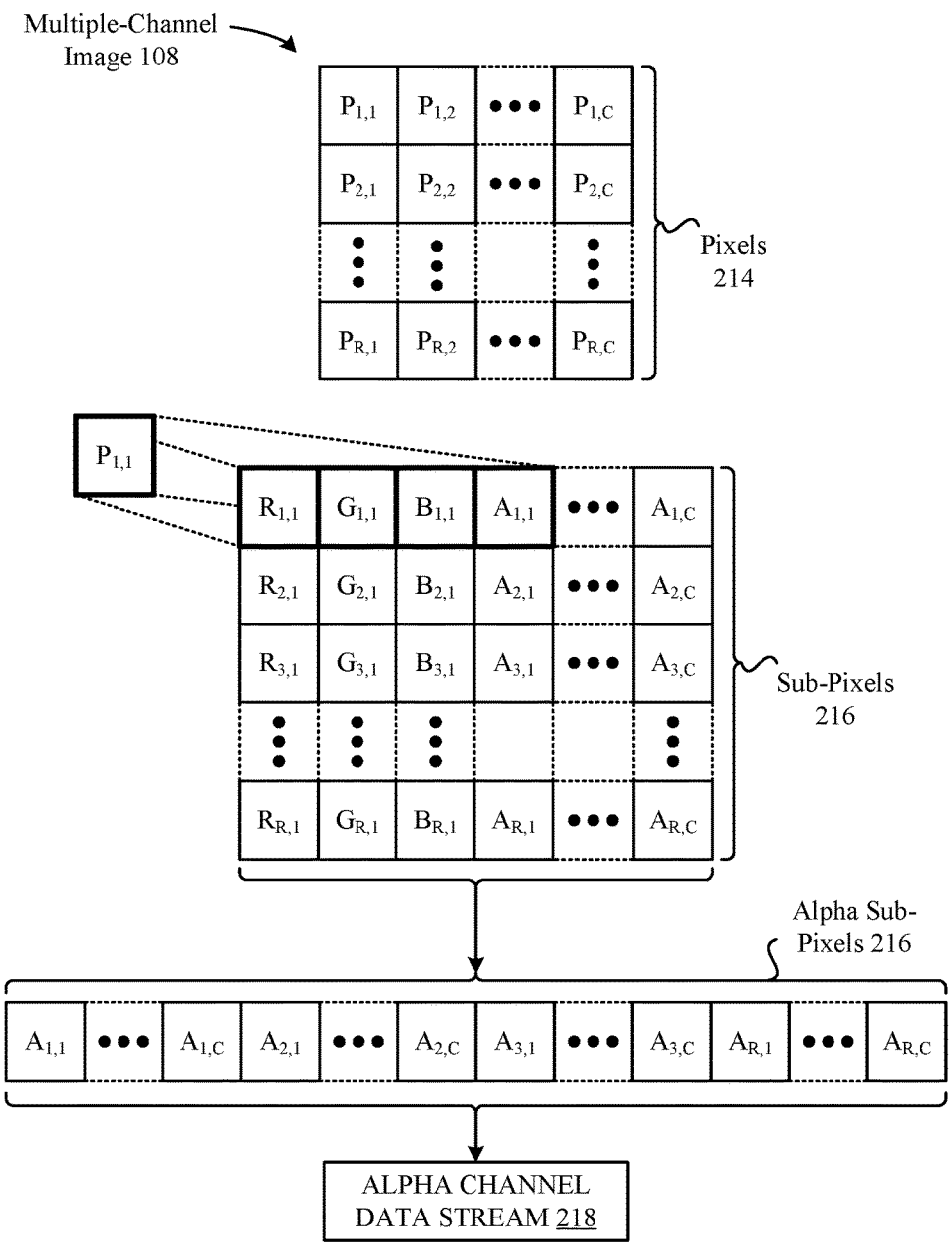
FIGS. 2A-2E illustrate a sequence of conceptual diagrams for pre-processing a multiple-channel image for compression, according to some embodiments.

FIGS. 2A-2E illustrate a sequence of conceptual diagrams for pre-processing a multiple-channel image 108 for compression, according to some embodiments. In particular, the conceptual diagrams illustrate a series of steps that the image analyzer 110 (and various sub-components) can be configured to carry out when pre-processing the multiple-channel image 108 for compression by the compressor(s) 120. As shown in FIG. 2A, a first step 210 can involve the alpha channel separator 112 receiving the multiple-channel image 108, which is composed of pixels 214 (denoted as "P"). As shown in FIG. 2A, the pixels 214 can be arranged according to a row/column layout, where the subscript of each pixel 214 "P" (e.g., "1,1") indicates the location of the pixel 214 in accordance with the rows and columns. In the example illustrated in FIG. 2A, the pixels 214 of the multiple-channel image 108 are arranged in an equal number of rows and columns, such that the multiple-channel image 108 is a square image. However, it is noted that the techniques described herein can be applied to multiple-channel images 108 having different layouts (e.g., disproportionate row/column counts).

In any case, as shown in FIG. 2A, each pixel 214 is composed of four sub-pixels 216—a red sub-pixel 216 (denoted "R"), a green sub-pixel 216 (denoted "G"), a blue sub-pixel (denoted "B") 216, and an alpha sub-pixel 216 (denoted "A"). It is noted that the alpha sub-pixel 216 can be excluded from the sub-pixels 216 without departing from the scope of this disclosure. In particular, the techniques performed in conjunction with step 210 of FIG. 2A can be omitted when the multiple-channel image 108 does not include an alpha channel (e.g., and instead is an RGB image), while continuing to achieve at least a subset of the compression benefits described herein. In any case, as shown in FIG. 2A, the alpha channel separator 112 can be configured to gather the alpha sub-pixels 216 and place them into an alpha channel data stream 218. For example, the alpha channel separator 112 can extract the alpha sub-pixels 216 in left to right (i.e., row-wise)/top down (i.e., column-wise) order, and place the alpha sub-pixels 216 into the alpha channel data stream 218. For example, as shown in FIG. 2A, the alpha sub-pixel 216 for the first pixel 214 "P(1,1)" can be extracted first, followed by the alpha sub-pixel 216 for the second pixel 214 "P(1,2)", and so on. It is noted that the alpha sub-pixels 216 can be extracted in any order from the sub-pixels 216 (and placed into the alpha channel data stream 218) without departing from the scope of this disclosure. In any case, at a later time, the alpha channel data stream 218 will be grouped with additional data streams that are provided to the compressor(s) 120, which is described below in greater detail in conjunction with FIGS. 2B-2E.

Figure 2B:
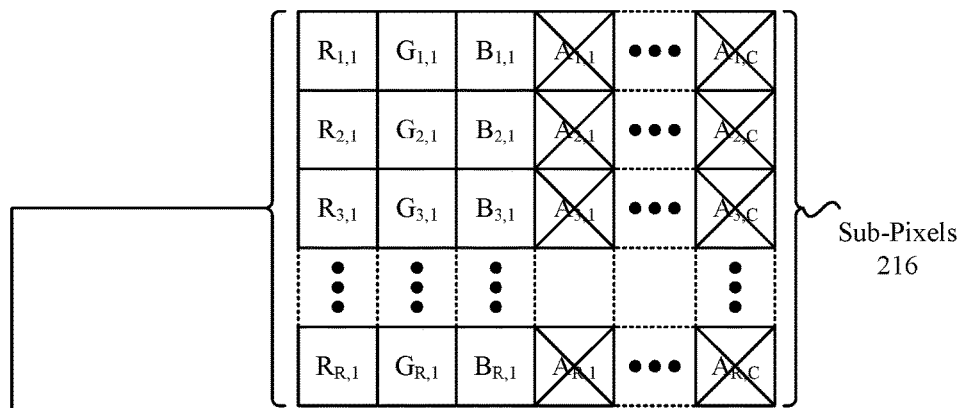
Figure 2B:
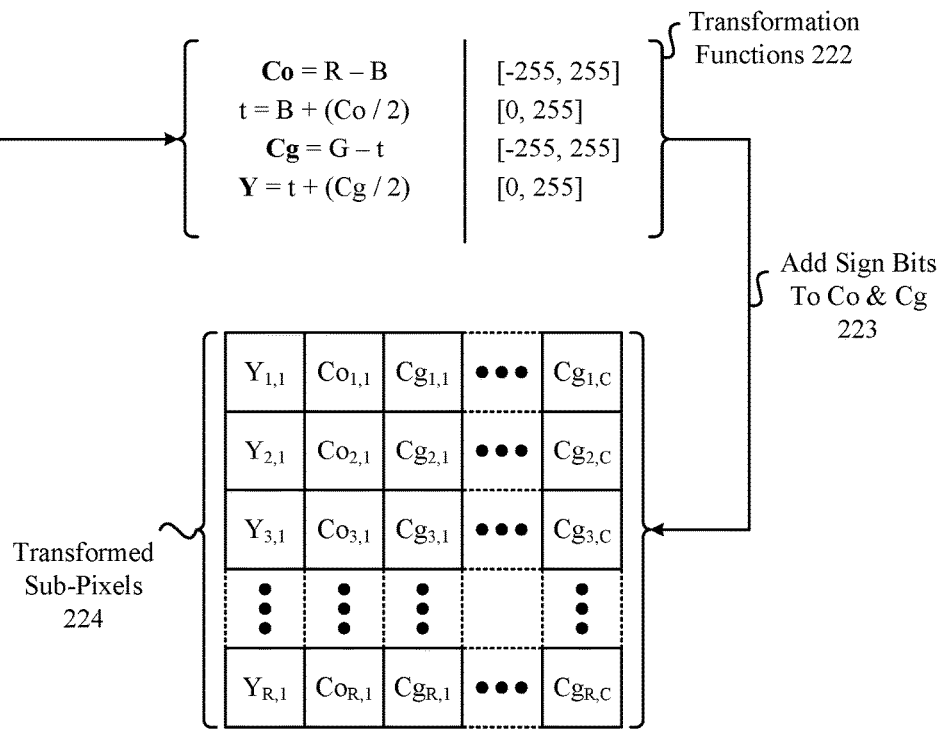

Next, FIG. 2B illustrates a step 220 in which the color space transformer 114 performs a collection of invertible transformation functions 222 on the remaining sub-pixels 216 (e.g., the red sub-pixels 216, the green sub-pixels 216, and the blue sub-pixels 216) of the pixels 214 to produce transformed sub-pixels 224. For example, as shown in FIG. 2B, the transformation functions 222 can involve carrying out a series of operations on the different sub-pixel values 216 to produce a luma value Y, a first chroma value CO, and a second chroma value CG. In particular, and according to some embodiments, the red sub-pixel 216 can be replaced by the luma value Y (e.g., 8 bits), the green sub-pixel 216 can be replaced by the first chroma value CO (e.g., 8 bits), and the blue sub-pixel 216 can be replaced by the second chroma value CG (e.g., 8 bits). As shown in FIG. 2B, the first chroma value CO and the second chroma value CG can each potentially take the form of a negative number. Accordingly, the color space transformer 114 can add a sign bit to the first chroma value CO and the second chroma value CG to account for the potential negative values (as illustrated by the event 223 in FIG. 2B), such that the first and second chroma values CO/CG are 9 bits in length. It is noted that the bit lengths described herein are merely exemplary, and that any bit-length can be utilized without departing from the scope of this disclosure. In any case, at this juncture, the overall characteristics of the multiple-channel image 108 are transformed in a manner that enables subsequent functions to be applied to ultimately improve compression ratios when compressing the multiple-channel image 108, which is described below in greater detail.

Figure 2C:
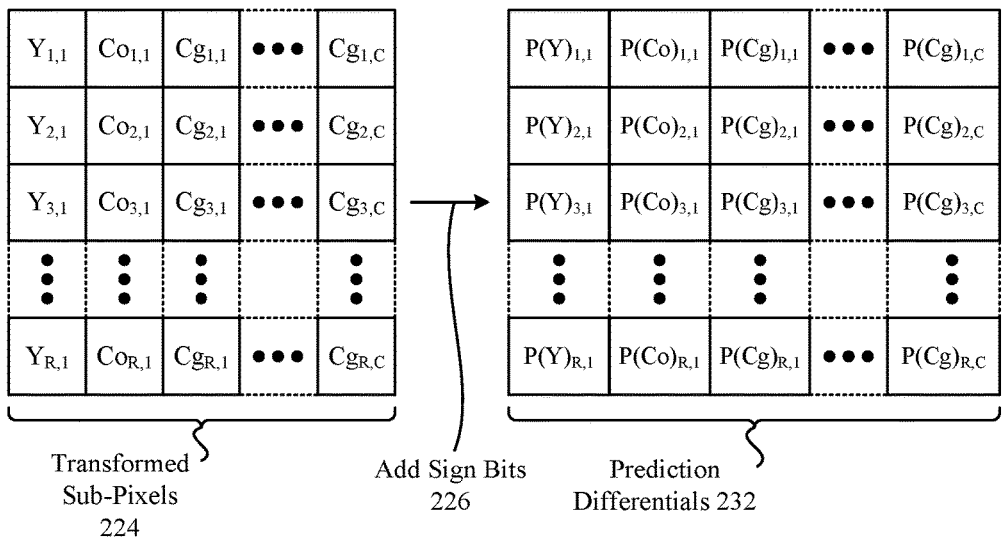
Figure 2C:
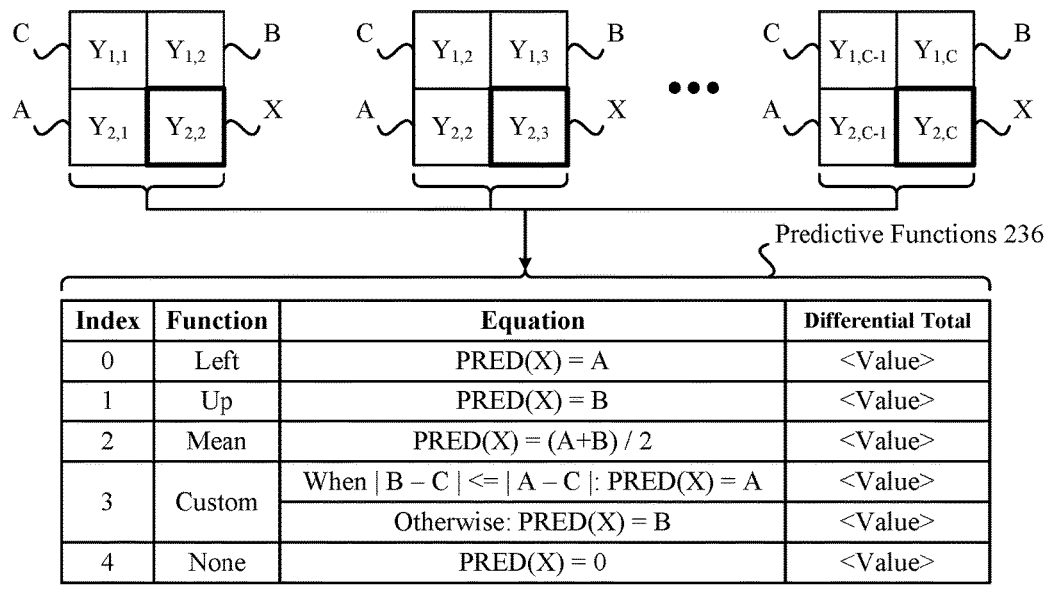

Turning now to FIG. 2C, a step 230 can involve the predictor 116 identifying, for each row of the transformed sub-pixels 224, a predictive function 236 (from among a group of predictive functions 236) that yields the most desirable prediction differentials 232 (i.e., prediction error) within the scope of the row. For example, an example scenario is shown FIG. 2C in which the second row of the transformed sub-pixels 224 that correspond to the luma value Y are processed using each of the Left, Up, Mean, and Custom predictive functions 236 to produce prediction differentials 232. Although not illustrated in FIG. 2C, it will be understood that the example scenario can also involve processing the second row of the different transformed sub-pixels 224 that correspond to the chroma values CO/CG using each of the Left, Up, Mean, and Custom predictive functions 236 to produce prediction differentials 232. In turn, the prediction differentials 232 (corresponding to the luma value Y and chroma values CO/CG within the second row) can be summed to establish a prediction differential total (performed separately for each of the predictive functions 236 applied against the second row). For example, as illustrated in FIG. 2C, the column "Differential Total" in the table of predictive functions 236 can be populated, for each row of transformed sub-pixels 224, with the values of the differential totals for the different predictive functions 236 applied against the row so that the most desirable predictive function 236 can be identified for the row.

In turn the predictor 116 can identify a most effective predictive function 236 for the second row based on the prediction differential totals. It is noted that the predictor 116 can implement any form of arithmetic when calculating the prediction differentials 232/prediction differential totals described herein. For example, the predictor 116 can be configured to sum the absolute value of the prediction differentials 232 for the transformed sub-pixels 224 of a given row (for each of the different predictive functions 236), and select the predictive function 236 that yields the smallest prediction differential total. In another example, the predictor 116 can (i) sum the prediction differentials 232 for the transformed sub-pixels 224 of a given row (for each of the different predictive functions 236), (ii) take the logarithm of the sums to produce logarithmic values, and (iii) select the predictive function 236 that yields the smallest logarithmic value. It is noted that the predictive functions 236 illustrated in FIG. 2C are merely exemplary, and that the predictor 116 can be configured to implement any number/type of predictive functions 236 without departing from the scope of this disclosure.

Figure 2D:
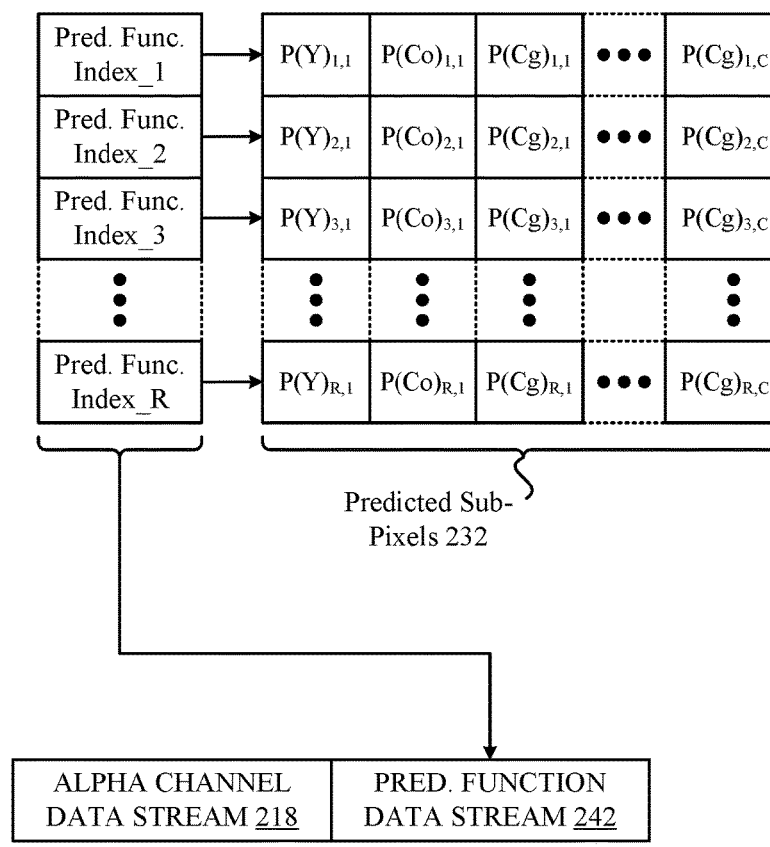

In any case, when the predictor 116 identifies a predictive function 236 that is most appropriate for a given row of transformed sub-pixels 224, the predictor 116 can store an identifier for the predictive function 236 within a predictive function data stream 242, as illustrated at step 240 of FIG. 2D. For example, as shown in FIG. 2D, the predictor 116 can identify the index of the selected predictive function 236 (e.g., in accordance with the table of predictive functions 236 illustrated in FIG. 2C) for each row of the transformed sub-pixels 224, and sequentially store the indices of the selected predictive functions 236 into the predictive function data stream 242. Thus, at the conclusion of step 240 in FIG. 2D, two separate data streams have been prepared for the compressor(s) 120—the alpha channel data stream 218 and the predictive function data stream 242. At this juncture, the selected predictive functions 236 are applied against their respective rows of transformed sub-pixels 224 to establish the prediction differentials 232 (e.g., as illustrated in FIG. 2C). Additionally, as shown in FIG. 2C, sign bits can be added (as illustrated by the element 226 in FIG. 2C) to the prediction differentials 232 to account for any negative differential values established by way of the predictive functions 236 (e.g., by subtracting predicted values from their respective transformed sub-pixels 224). At this juncture, additional operations can be performed against the prediction differentials 232 to further-enhance the resulting compression ratios that can be achieved, which are described below in greater detail in conjunction with FIG. 2E.

Figure 2E:
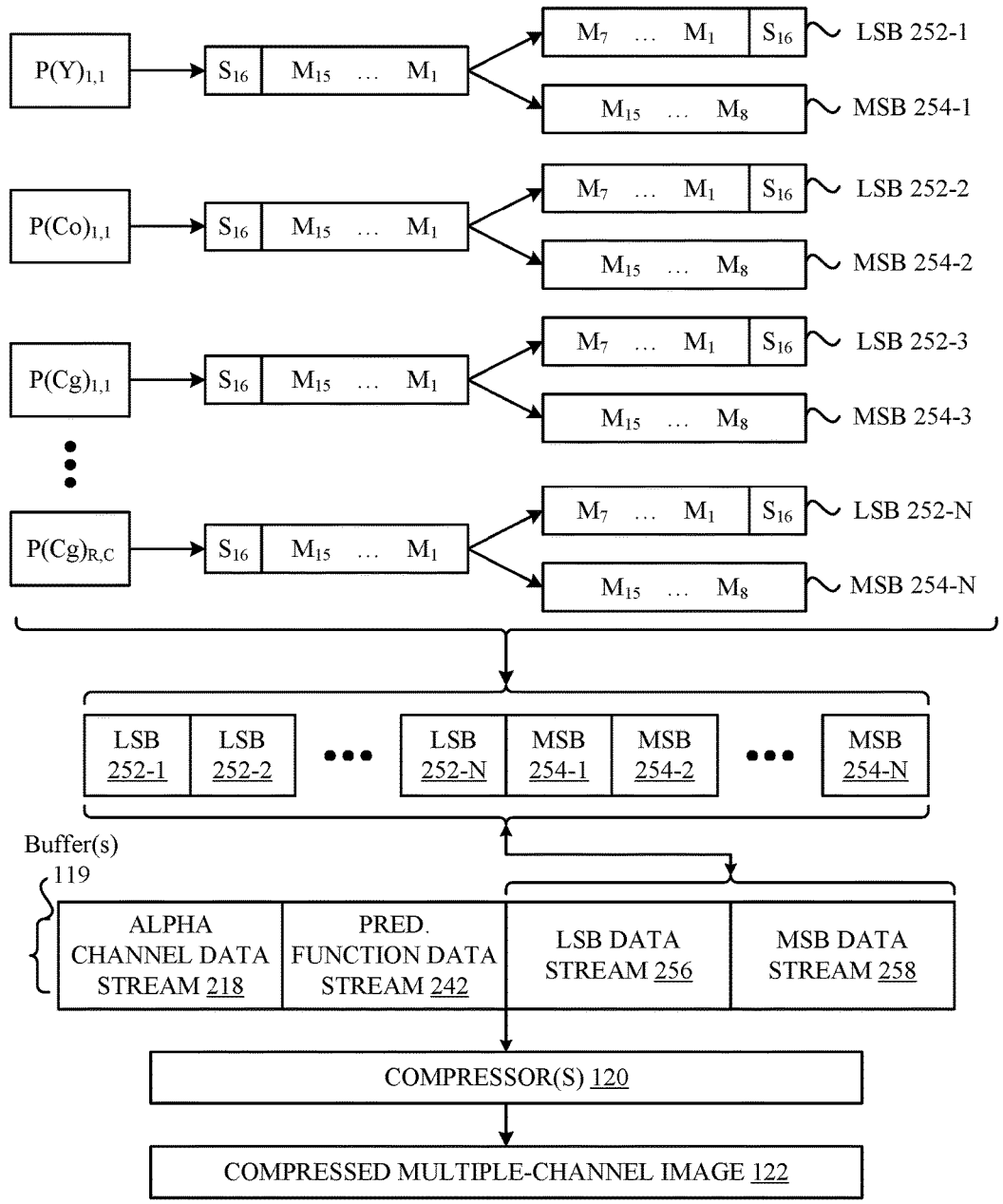

As shown in FIG. 2E, a final step 250 can involve the encoder 118 separating the prediction differentials 232—specifically, the bits of each of prediction differential 232—into a least significant byte 252 and a most significant byte 254. For example, as shown in FIG. 2E, the prediction differential 232 for the luma value Y (of the pixel 214 (1,1))—which includes (1) a sign bit (S16) established by way of the predictive functions 236 (applied at step 230 of FIG. 2C), and (2) up to fifteen magnitude bits (M15-M1) (i.e., the prediction differential 232 itself)—can be separated into a least significant byte 252-1 and a most significant byte 254-1. In particular, the sign bit (S16) can be positioned within a least significant bit of the least significant byte 252, followed by seven of the least significant magnitude bits (M7-M1). Additionally, eight of the most significant magnitude bits (M15-M8) can be positioned within the most significant byte 254-1.

Additionally, as shown in FIG. 2E, the prediction differential 232 for the chroma value CO (of the pixel 214 (1,1))—which includes (1) a sign bit (S16) established by way of the predictive functions 236 (applied at step 230 of FIG. 2C), and (2) up to fifteen magnitude bits (M15-M1) (i.e., (i) the first sign bit established by the transformation functions 222 (applied at step 220 of FIG. 2B), and (ii) the prediction differential 232 itself)—can be separated into a least significant byte 252-2 and a most significant byte 254-2. Similarly, the prediction differential 232 for the chroma value CG (of the pixel 214 (1,1))—which includes (1) the sign bit (S16) established by way of the predictive functions 236 (applied at step 230 of FIG. 2C), and (2) up to fifteen magnitude bits (M15-M1) (i.e., (i) the first sign bit established by the transformation functions 222 (applied at step 220 of FIG. 2B), and (ii) the prediction differential 232 itself)—can be separated into a least significant byte 252-3 and a most significant byte 254-3.

It is noted that the encoder 118 can perform the foregoing techniques using a variety of approaches, e.g., performing in-place modifications if the prediction differentials 232 (and ordered according to the distribution illustrated in FIG. 2D), copying the prediction differentials 232 into respective data structures for the least significant bytes 252 and the most significant bytes 254 (and ordered according to the distribution illustrated in FIG. 2D), and so on. It is also noted that the distributions illustrated in FIG. 2E and described herein are exemplary, and that any distribution of the bits of the prediction differentials 232 can be utilized without departing from the scope of this disclosure.

In any case, when the encoder 118 establishes the least significant bytes 252 and the most significant bytes 254 for each of the prediction differentials 232, the encoder 118 can group the least significant bytes 252 into a least significant byte data stream 256 (e.g., in a left to right (i.e., row-wise)/top down (i.e., column-wise) order). Similarly, the encoder 118 can group the most significant bytes 254 into a most significant bye data stream 258 (e.g., in a left to right (i.e., row-wise)/top down (i.e., column-wise) order). At this juncture, four data streams have been established: the alpha channel data stream 218, the predictive function data stream 242, the least significant byte data stream 256, and the most significant byte data stream 258. In turn, the encoder 118 can provide these data streams into the buffer(s) 119, and invoke the compressor(s) 120 to compress the buffer(s) 119. Subsequently, the compressor(s) 120 can take action and compress the contents of the buffer(s) 119 to produce a compressed output. In this manner, the compressed outputs can be joined together to produce a compressed multiple-channel image 122.

Additionally, it is noted that the image analyzer 110 can be configured to pre-process the multiple-channel image 108 using other approaches to identify additional optimizations that can be afforded with respect to compressing the multiple-channel image 108. For example, the image analyzer 110 can be configured to take advantage of any symmetry that is identified within the multiple-channel image 108. For example, the image analyzer 110 can be configured to (1) identify vertical symmetry, horizontal symmetry, diagonal symmetry, etc., within the multiple-channel image 108, (2) carve out the redundant pixels 214, and (3) process the remaining pixels 214. For example, when a multiple-channel image 108 is both vertically and horizontally symmetric, the image analyzer 110 can process only a single quadrant of the multiple-channel image 108 to increase efficiency. In another example, when the multiple-channel image 108 is diagonally symmetrical, the image analyzer 110 can process only a single triangular portion of the multiple-channel image 108 to increase efficiency. In any case, when these efficiency measures are invoked, the image analyzer 110 can be configured to store, within the compressed multiple-channel image 122, information about the symmetry so that the disregarded portions can be re-established when the compressed multiple-channel image 122 is decompressed/rebuilt at the computing device 102.

Figure 3:
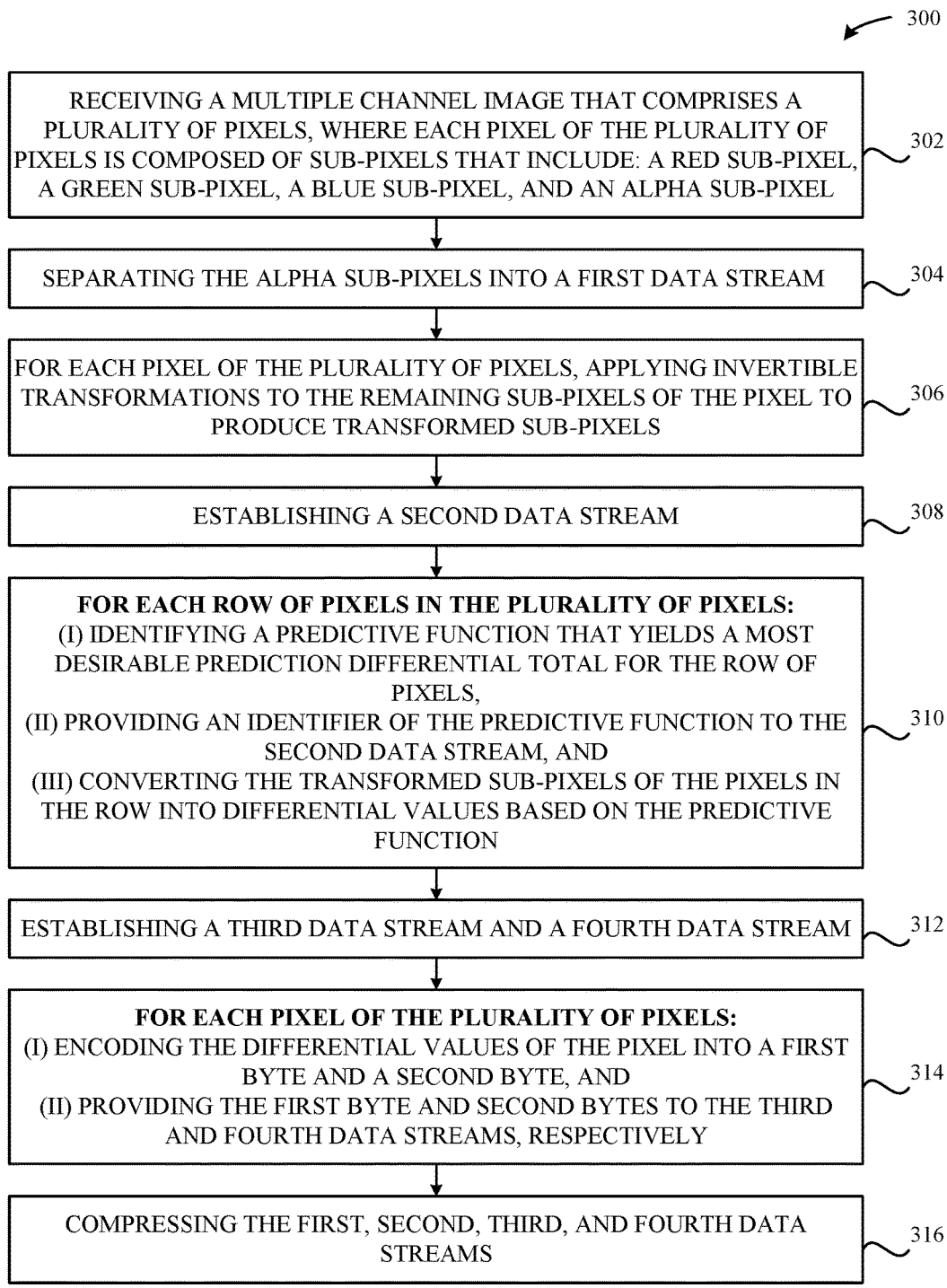
FIG. 3 illustrates a method for pre-processing a multiple-channel image for compression, according to some embodiments.

FIG. 3 illustrates a method 300 for pre-processing a multiple-channel image 108 for compression, according to some embodiments. As shown in FIG. 3, the method 300 begins at step 302, where the image analyzer 110 receives image data for the multiple-channel image 108. As described herein, the image data can be composed of a plurality of pixels 214, where each pixel 214 of the plurality of pixels 214 is composed of sub-pixels 216 that include: a red sub-pixel 216, a green sub-pixel 216, a blue sub-pixel 216, and an alpha sub-pixel 216.

At step 304, the image analyzer 110 separates the alpha sub-pixels 216 into a first data stream (e.g., the alpha channel data stream 218 described above in conjunction with FIG. 2A). At step 306, the image analyzer 110 applies, for each pixel 214 of the plurality of pixels 214, invertible transformations (e.g., the transformation functions 222 described above in conjunction with FIG. 2B) to the remaining sub-pixels 216 of the pixel 214 to produce transformed sub-pixels (e.g., the transformed sub-pixels 224 described above in conjunction with FIG. 2B). At step 308, the image analyzer 110 establishes a second data stream (e.g., the predictive functions data stream 242 described above in conjunction with FIG. 2D). At step 310, the image analyzer 110 performs the following for each row of pixels 214 in the plurality of pixels 214: (i) identifying a predictive function (e.g., a predictive function 236, as described above in conjunction with FIG. 2C) that yields a most desirable prediction differential total for the row of pixels 214 (e.g., as described above in conjunction with FIG. 2C), (ii) providing an identifier of the predictive function 236 to the second data stream (e.g., as described above in conjunction with FIG. 2D), and (iii) converting the transformed sub-pixels 224 of the pixels in the row of pixels 214 into prediction differentials 232 based on the predictive function 236 (e.g., as described above in conjunction with FIGS. 2C-2D).

At step 312, the image analyzer 110 establishes a third data stream and a fourth data stream (e.g., the least significant byte data stream 256 and the most significant byte data stream 258, as described above in conjunction with FIG. 2E). At step 314, the image analyzer 110 performs the following for each pixel 214 of the plurality of pixels 214: (i) encoding the prediction differentials 232 of the pixel 214 into a first byte and a second byte (e.g., as described above in conjunction with FIG. 2E), and (ii) providing the first byte and second bytes to the third and fourth data streams, respectively (e.g., as described above in conjunction with FIG. 2E). Finally, at step 316, the image analyzer 110 compresses the first, second, third, and fourth data streams (e.g., as described above in conjunction with FIG. 2E) using the compressor(s) 120.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the image analyzer 110/compressor(s) 120.

Figure 5:
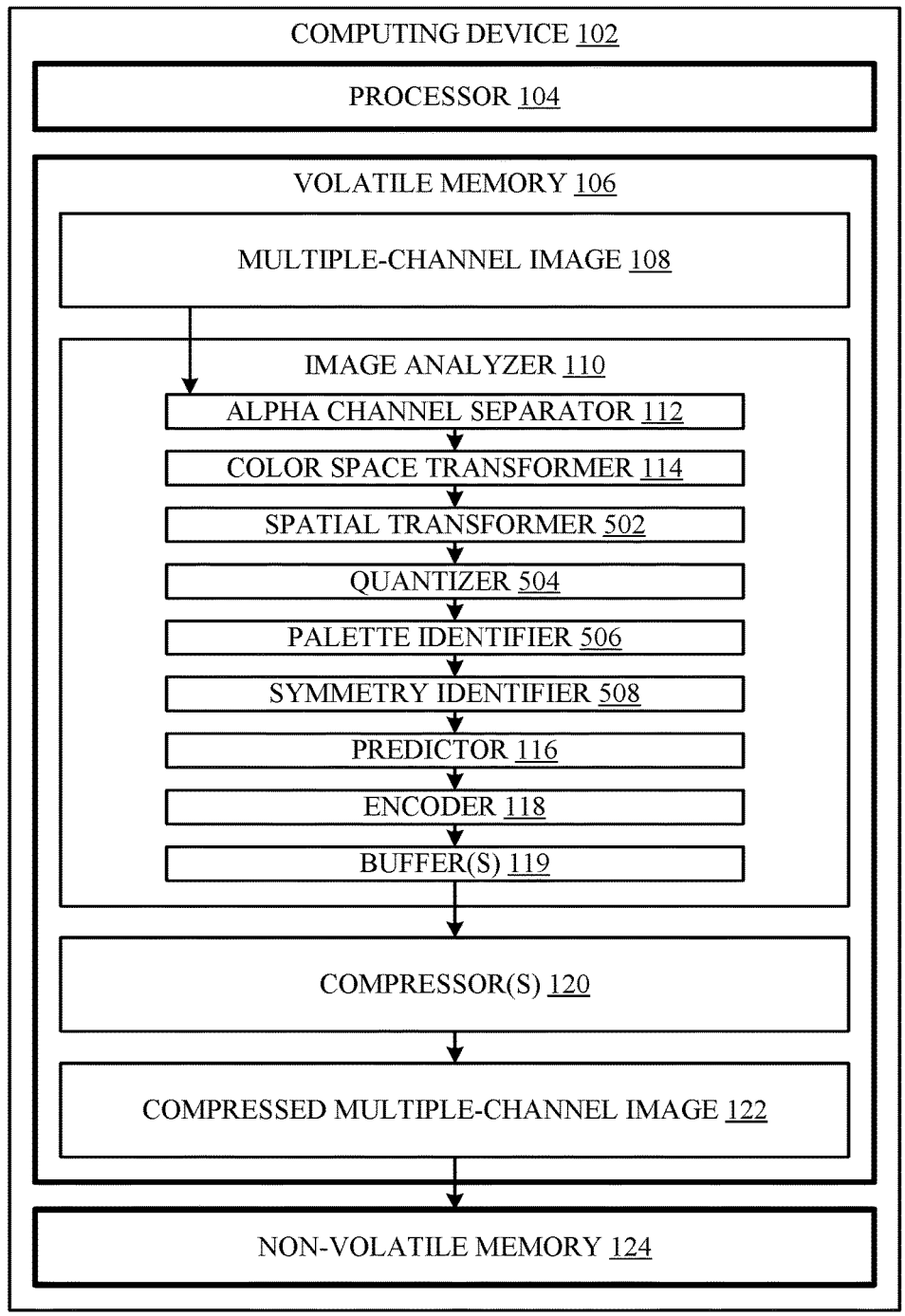
FIG. 5 illustrates an overview of a modified version of the computing device of FIG. 1 that implements an expanded approach for pre-processing a multiple-channel image for compression, according to some embodiments.

Additionally, FIG. 5 illustrates an overview 500 of a modified version of the computing device 102 of FIG. 1 that implements an expanded approach for pre-processing a multiple-channel image 108 for compression, according to some embodiments. In particular, and as shown in FIG. 5, the image analyzer 110 illustrated in FIG. 5 can be configured to include the same components as the image analyzer 110 illustrated in FIG. 1, with the addition of a spatial transformer 502, a quantizer 504, a palette identifier 506, and a symmetry identifier 508. As described in greater detail below in conjunction with FIGS. 6A-6H and 7A-7B, these various components can further-improve the overall compression ratios that are achieved when pre-processing multiple-channel images 108.

Figure 6A:
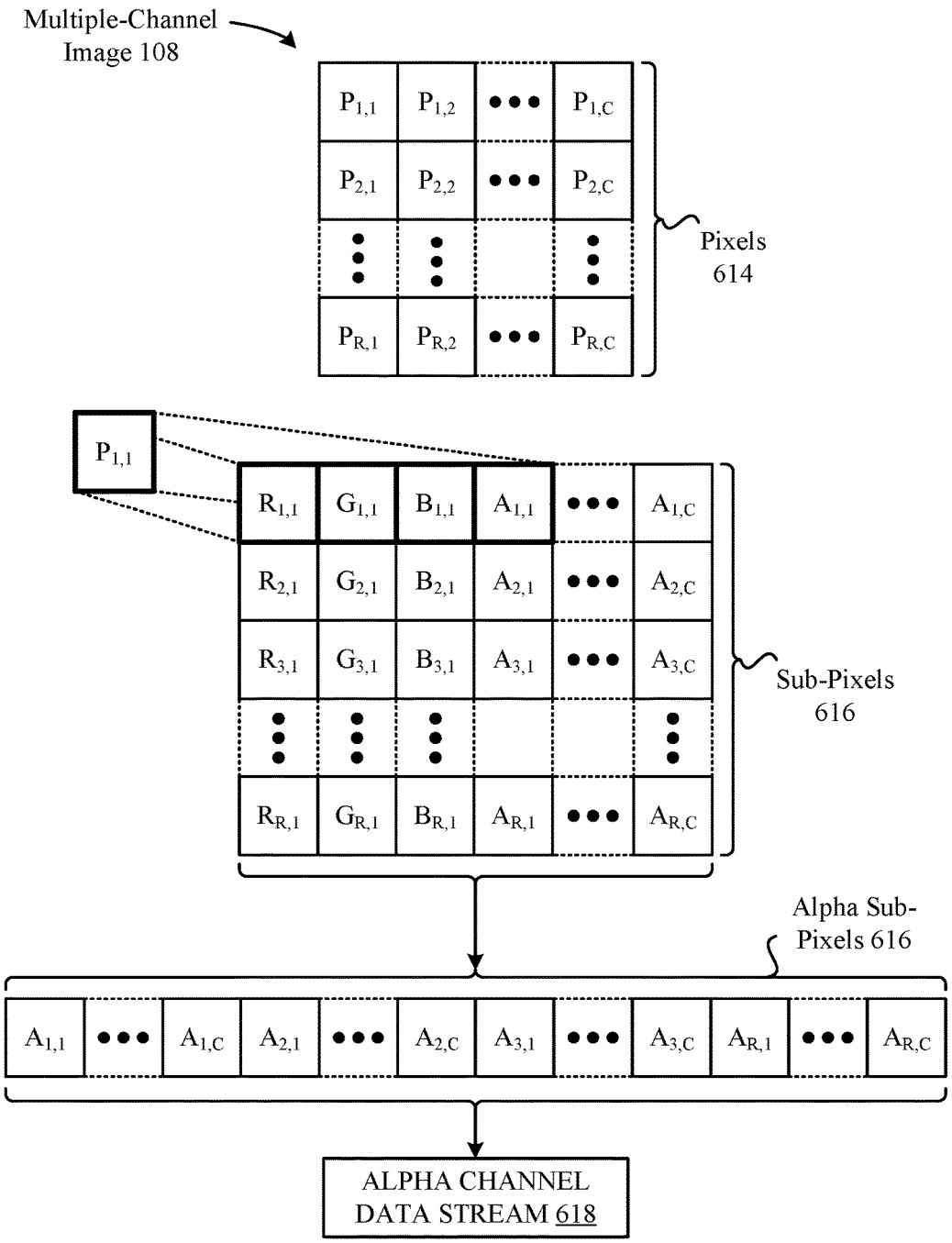

FIGS. 6A-6H illustrate a sequence of conceptual diagrams for the expanded approach for pre-processing a multiple-channel image 108 for compression, according to some embodiments. In particular, the conceptual diagrams illustrate a series of steps that the image analyzer 110 (and various sub-components) illustrated in FIG. 5 can be configured to carry out when pre-processing the multiple-channel image 108 for compression by the compressor(s) 120. As shown in FIG. 6A, a first step 601 can involve the alpha channel separator 112 receiving the multiple-channel image 108, which is composed of pixels 614 (denoted as "P"). As shown in FIG. 6A, the pixels 614 can be arranged according to a row/column layout, where the subscript of each pixel 614 "P" (e.g., "1,1") indicates the location of the pixel 614 in accordance with the rows and columns. In the example illustrated in FIG. 6A, the pixels 614 of the multiple-channel image 108 are arranged in an equal number of rows and columns, such that the multiple-channel image 108 is a square image. However, it is again noted that the techniques described herein can be applied to multiple-channel images 108 having different layouts (e.g., disproportionate row/column counts).

In any case, as shown in FIG. 6A, each pixel 614 is composed of four sub-pixels 616—a red sub-pixel 616 (denoted "R"), a green sub-pixel 616 (denoted "G"), a blue sub-pixel (denoted "B") 616, and an alpha sub-pixel 616 (denoted "A"). It is noted that the alpha sub-pixel 616 can be excluded from the sub-pixels 616 without departing from the scope of this disclosure. In particular, the techniques performed in conjunction with step 601 of FIG. 6A can be omitted when the multiple-channel image 108 does not include an alpha channel (e.g., and instead is an RGB image), while continuing to achieve at least a portion of the compression benefits described herein. In any case, as shown in FIG. 6A, the alpha channel separator 112 can be configured to gather the alpha sub-pixels 616 and place them into an alpha channel data stream 618. For example, the alpha channel separator 112 can extract the alpha sub-pixels 616 in a left to right (i.e., row-wise)/top down (i.e., column-wise) order, and place the alpha sub-pixels 616 into the alpha channel data stream 618. For example, as shown in FIG. 6A, the alpha sub-pixel 616 for the first pixel 614 "P(1,1)" can be extracted first, followed by the alpha sub-pixel 616 for the second pixel 614 "P(1,2)", and so on. It is noted that the alpha sub-pixels 616 can be extracted in any order from the sub-pixels 616 (and placed into the alpha channel data stream 618) without departing from the scope of this disclosure. In any case, at a later time, the alpha channel data stream 618 will be grouped with additional data streams that are provided to the compressor(s) 120, which is described below in greater detail in conjunction with FIGS. 6G-6H.

Figure 6B:
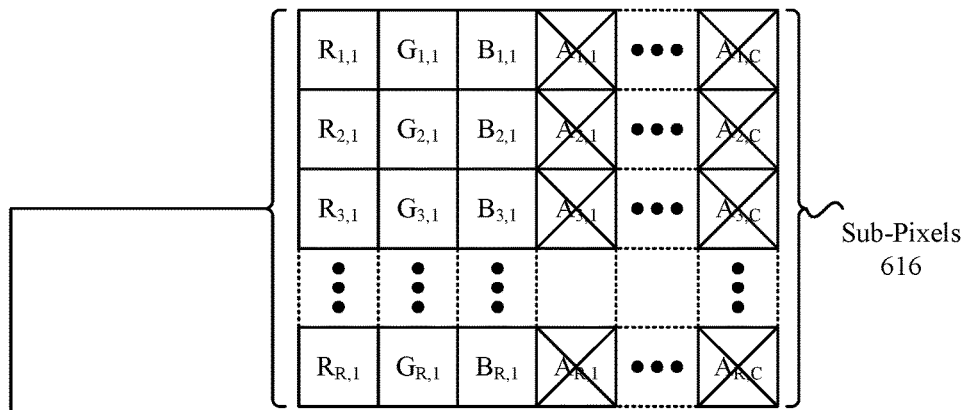
Figure 6B:
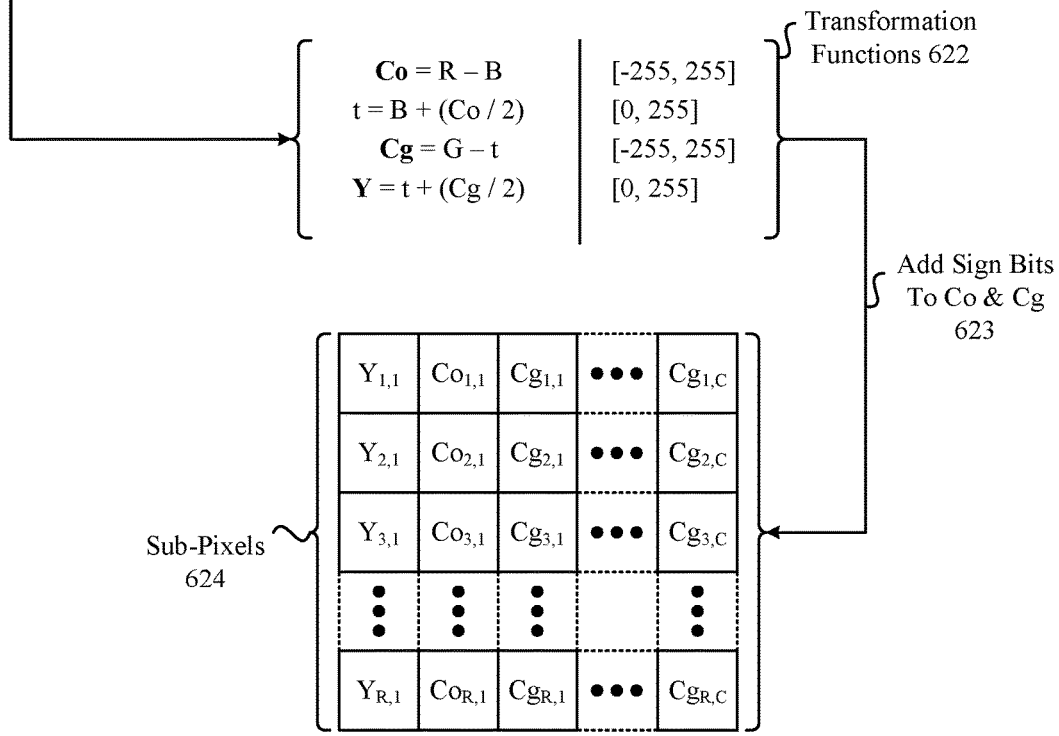

Next, FIG. 6B illustrates a step 602 in which the color space transformer 114 performs a collection of invertible color space transformation functions 622 on the remaining sub-pixels 616 (e.g., the red sub-pixels 616, the green sub-pixels 616, and the blue sub-pixels 616) of the pixels 614 to produce sub-pixels 624. For example, as shown in FIG. 6B, the color space transformation functions 622 can involve carrying out a series of operations on the different sub-pixel values 216 to produce a luma value Y, a first chroma value CO, and a second chroma value CG. In particular, and according to some embodiments, the red sub-pixel 616 can be replaced by the luma value Y (e.g., 8 bits), the green sub-pixel 616 can be replaced by the first chroma value CO (e.g., 8 bits), and the blue sub-pixel 616 can be replaced by the second chroma value CG (e.g., 8 bits). As shown in FIG. 6B, the first chroma value CO and the second chroma value CG can each potentially take the form of a negative number. Accordingly, the color space transformer 114 can add a sign bit to the first chroma value CO and the second chroma value CG to account for the potential negative values (as illustrated by the event 623 in FIG. 6B), such that the first and second chroma values CO/CG are 9 bits in length. It is noted that the bit lengths described herein are merely exemplary, and that any bit-length can be utilized without departing from the scope of this disclosure. In any case, at this juncture, the overall characteristics of the multiple-channel image 108 are transformed in a manner that enables subsequent functions to be applied to ultimately improve compression ratios when compressing the multiple-channel image 108, which is described below in greater detail.

Turning now to FIG. 6C, a step 603 can involve the spatial transformer 502 applying additional invertible spatial transformation functions 626 to each of the sub-pixels 624. According to some embodiments, the spatial transformer 502 can be configured to apply the invertible spatial transformation functions 626 to one or more of the luma value Y, the first chroma value CO, or the second chroma value CG for each of the sub-pixels 624. The invertible spatial transformation function 626 applied to each sub-pixel 624 can represent, for example, a Haar average-difference transformation, as illustrated in FIG. 6C. It is noted that the use of the Haar average-difference transformation is exemplary, and that the spatial transformer 502 can employ other transformations that are distinct from the Haar average-difference transformation without departing from the scope of this disclosure.

In any case, the Haar average-difference transformation illustrated in FIG. 6C can involve calculating—for (i) the luma value Y, (ii) the first chroma value CO, and/or (iii) the second chroma value CG of each sub-pixel 624 of the sub-pixels 624—a "difference" value and a "mean" value. For example, the difference value for a luma value Y of a first sub-pixel 624 (e.g., $Y_{1,1}$) can be calculated using a luma value Y of a second sub-pixel 624 (e.g., $Y_{1,2}$) that is nearby the first sub-pixel 624 (e.g., side-by-side sub-pixels 624). Additionally, the mean value for the luma value Y of the first sub-pixel 624 (i.e., $Y_{1,1}$) can be calculated using the distance value divided by an integer (e.g., two). As shown in FIG. 6C, the same approaches can be applied to the first chroma value CO and the second chroma value CG for each sub-pixel 624. However, it is noted that any subset of the luma value Y, the first chroma value CO, and the second chroma value CG can be excluded when performing the invertible transformations illustrated in FIG. 6C without departing from the scope of this disclosure. In any case, the sub-pixels 628 illustrated in FIG. 6C represent the resulting sub-pixels after the sub-pixels 624 are transformed by the spatial transformer 502.

Figure 6D:
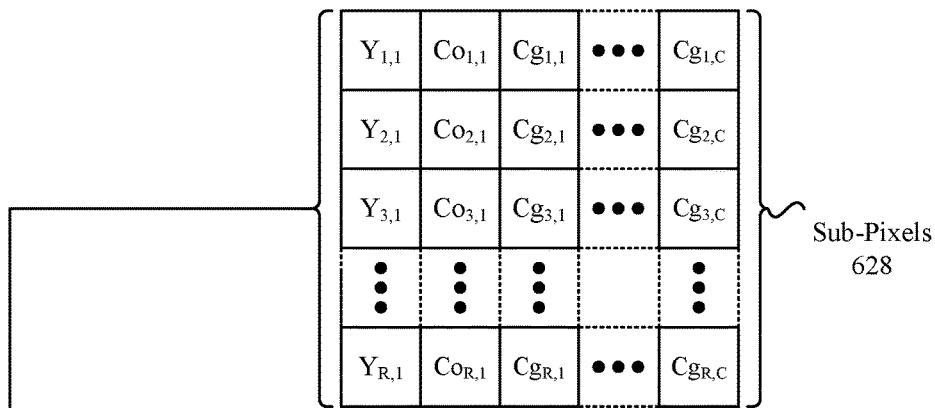
Figure 6D:
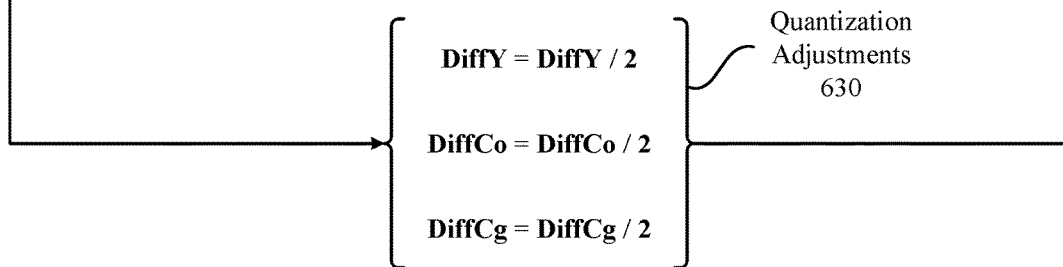
Figure 6D:
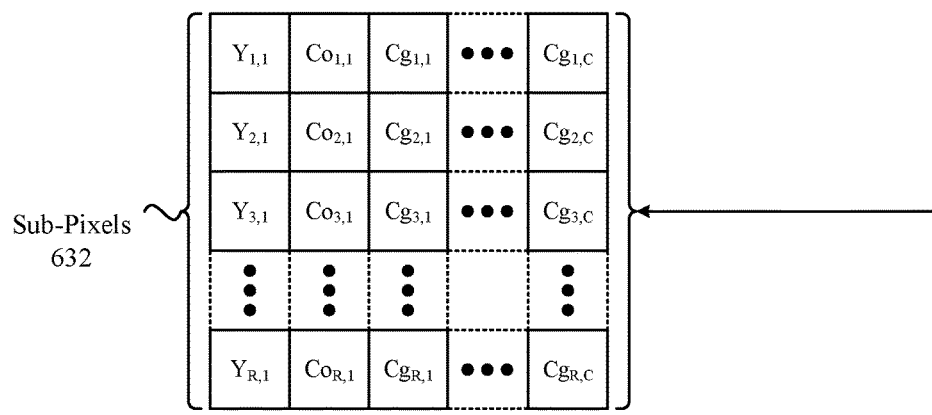

Turning now to FIG. 6D, a step 604 can involve the quantizer 504 applying "lossy" quantization adjustments 630 against the difference values calculated for the sub-pixels 628 (as described above in conjunction with FIG. 6C).

According to some embodiments, and as shown in FIG. 6D, the quantization adjustments 630 can involve—for one or more of the luma value Y, the first chroma value CO, or the second chroma value CG for each of the sub-pixels 624— dividing the respective difference value by an integer (e.g., two). For example, for a given sub-pixel 628, the difference value (i.e., "DiffY") for the luma value Y can be quantized by dividing the DiffY value by two. Similarly, for the sub-pixel 628, the difference value (i.e., "DiffCo") for the first chroma value Co can be quantized by dividing the DiffCo value by two. Further, for the sub-pixel 628, the difference value (i.e., "DiffCg") for the second chroma value Cg can be quantized by dividing the DiffCg value by two. It is noted that any subset of the luma value Y, the first chroma value CO, and the second chroma value CG can be excluded when performing the quantization adjustments illustrated in FIG. 6D without departing from the scope of this disclosure. In any case, the sub-pixels 632 illustrated in FIG. 6D represent the resulting sub-pixels after the sub-pixels 628 are transformed by the quantizer 504.

Figure 6E:
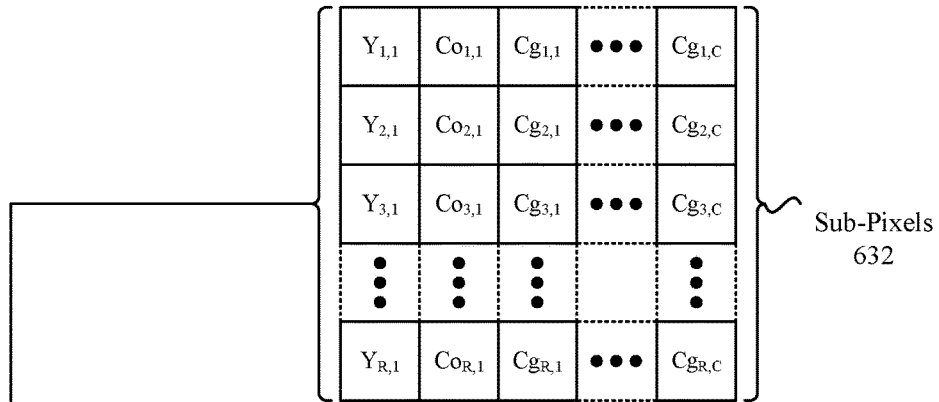
Figure 6E:
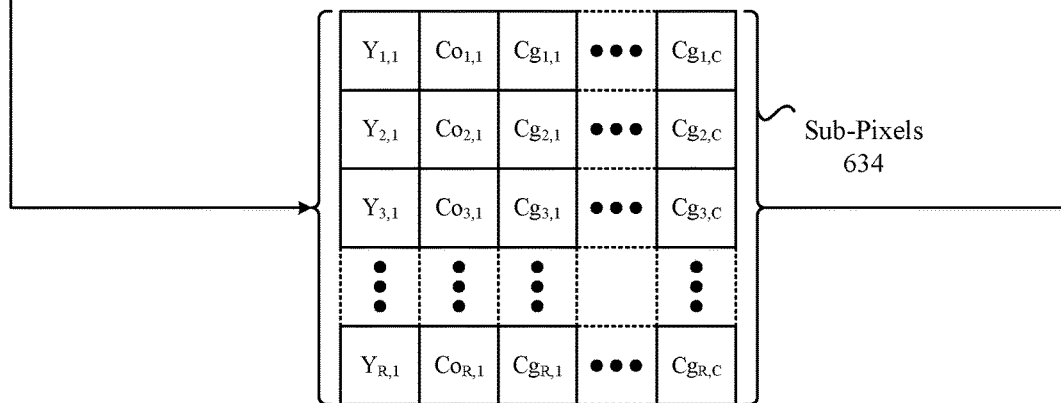
Figure 6E:
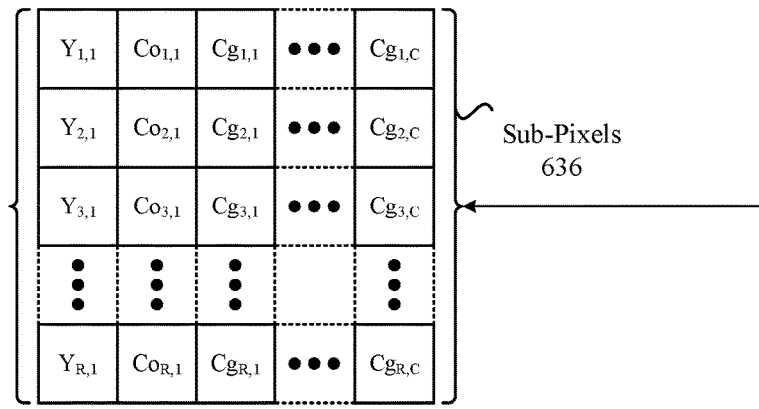

Turning now to FIG. 6E, a step 605 can involve the palette identifier 506 transforming the sub-pixels 632 into sub-pixels 634 based on a palette representation. In particular, and according to some embodiments, the palette identifier 506 can be configured to identify all unique pairs of first and second chroma values (CO, CG) for each of the sub-pixels 632 to establish a palette. For example, the palette can be represented in an array having a number of entries that matches the identified unique pairs of first and second chroma values (CO, CG), where each entry stores the values for the respective pair of first and second chroma values (CO, CG). In this regard, the first and second chroma values (CO, CG) for each of the sub-pixels 634 can be updated to reflect an index within the array that corresponds to the first and second chroma values (CO, GC), thereby compacting the overall amount of data that otherwise is required to store the first and second chroma values (CO, CG). According to some embodiments, the palette identifier 506 can analyze whether the palette representation (i.e., the sub-pixels 634) contributes to a compression ratio that exceeds a compression ratio that would otherwise be achieved if the palette transformation is disregarded (i.e., the sub-pixels 632). According to some embodiments, when the number of identified unique pairs of first and second chroma values (CO, CG) is less than or equal to two hundred fifty-six (256), a least significant byte (LSB) stream of the indices is sufficient. Otherwise, a most significant byte (MSB) stream of the indices can be used as well. Notably, when the MSB stream of indices is utilized, the LSB and MSB streams can be separated from the corresponding luma values Y.

Additionally, FIG. 6E can additionally include a step 606 that involves the symmetry identifier 508 transforming the sub-pixels 634 into sub-pixels 636 based on symmetries, if any, that are identified within the sub-pixels 634, as it is common for images to possess symmetrical characteristics. For example, an image can be left-right symmetric (i.e., across a middle vertical line), top-bottom symmetric (i.e., around a middle horizontal line), diagonally symmetric (i.e., across a middle diagonal line), and so forth. According to some embodiments, the symmetry identifier 508 can be configured to analyze identify whether the sub-pixels 634 possess any form of symmetry. For example, when the sub-pixels 634 possess symmetry—e.g., left-right, top-bottom, diagonal, etc.—then only a portion of the sub-pixels 634 need to be further-processed by the image analyzer 110. For example, when a multiple-channel image 108 is both vertically and horizontally symmetric, the image analyzer 110 can process only a single quadrant of the multiple-channel image 108 to increase efficiency. In another example, when the multiple-channel image 108 is diagonally symmetrical, the image analyzer 110 can process only a single triangular portion of the multiple-channel image 108 to increase efficiency. It is noted that the symmetry identifier 508 can be configured to process the sub-pixels 634 at any level of granularity to identify any level of symmetry. For example, the symmetry identifier 508 can analyze the sub-pixels 634 on a row-by-row basis to identify partial symmetry that exists within the multi-channel image 108. Additionally, it is noted that the symmetry identifier 508 can analyze whether one or more identified symmetries (i.e., the sub-pixels 636) contribute to a compression ratio that exceeds a compression ratio that would otherwise by achieved if the symmetry identification is disregarded (i.e., the sub-pixels 634).

Turning now to FIG. 6F, a step 607 can involve the predictor 116 identifying, for each row of the sub-pixels 636, a predictive function 642 (from among a group of predictive functions 642) that yields the most desirable prediction differentials 640 (i.e., prediction error) within the scope of the row (e.g., as described above in conjunction with FIG. 2C). For example, an example scenario is shown FIG. 6F in which the second row of the sub-pixels 636 that correspond to the luma value Y are processed using each of the Left, Up, Mean, and Custom predictive functions 642 to produce prediction differentials 640. Although not illustrated in FIG. 6F, it will be understood that the example scenario can also involve processing the second row of the different sub-pixels 636 that correspond to the chroma values CO/CG using each of the Left, Up, Mean, and Custom predictive functions 642 to produce prediction differentials 640. In turn, the prediction differentials 640 (corresponding to the luma value Y and chroma values CO/CG within the second row) can be summed to establish a prediction differential total (performed separately for each of the predictive functions 642 applied against the second row). For example, as illustrated in FIG. 6F, the column "Differential Total" in the table of predictive functions 642 can be populated, for each row of sub-pixels 636, with the values of the differential totals for the different predictive functions 642 applied against the row so that the most desirable predictive function 642 can be identified for the row.

In turn the predictor 116 can identify a most effective predictive function 642 for the second row based on the prediction differential totals. It is noted that the predictor 116 can implement any form of arithmetic when calculating the prediction differentials 640/prediction differential totals described herein. For example, the predictor 116 can be configured to sum the absolute value of the prediction differentials 640 for the sub-pixels 636 of a given row (for each of the different predictive functions 642), and select the predictive function 642 that yields the smallest prediction differential total. In another example, the predictor 116 can (i) sum the prediction differentials 640 for the sub-pixels 636 of a given row (for each of the different predictive functions 642), (ii) take the logarithm of the sums to produce logarithmic values, and (iii) select the predictive function 642 that yields the smallest logarithmic value. It is noted that the predictive functions 642 illustrated in FIG. 6F are merely exemplary, and that the predictor 116 can be configured to implement any number/type of predictive functions 642 without departing from the scope of this disclosure.

Figure 6G:
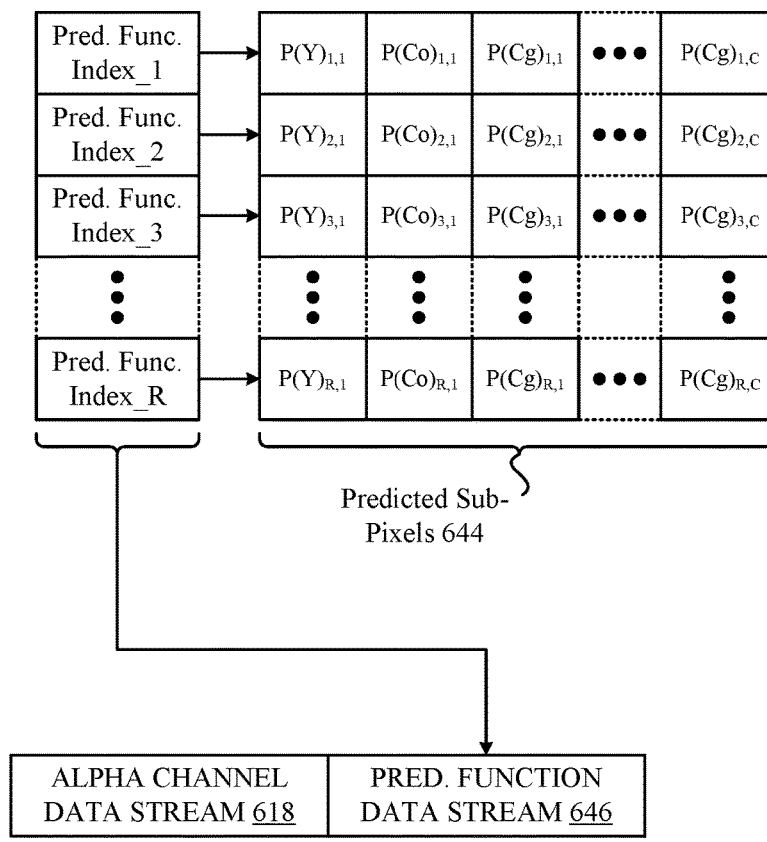

In any case, when the predictor 116 identifies a predictive function 642 that is most appropriate for a given row of sub-pixels 636, the predictor 116 can store an identifier for the predictive function 642 within a predictive function data stream 644, as illustrated at step 608 of FIG. 6G. For example, as shown in FIG. 6G, the predictor 116 can identify the index of the selected predictive function 642 (e.g., in accordance with the table of predictive functions 642 illustrated in FIG. 6F) for each row of the sub-pixels 636, and sequentially store the indices of the selected predictive functions 642 into the predictive function data stream 644. Thus, at the conclusion of step 608 in FIG. 6G, two separate data streams have been prepared for the compressor(s) 120—the alpha channel data stream 618 and the predictive function data stream 644. At this juncture, the selected predictive functions 642 are applied against their respective rows of sub-pixels 636 to establish the prediction differentials 640 (e.g., as illustrated in FIG. 6F). Additionally, as shown in FIG. 6F, sign bits can be added (as illustrated by the element 638 in FIG. 6F) to the prediction differentials 640 to account for any negative differential values established by way of the predictive functions 642 (e.g., by subtracting predicted values from their respective sub-pixels 636). At this juncture, additional operations can be performed against the prediction differentials 640 to further-enhance the resulting compression ratios that can be achieved, which are described below in greater detail in conjunction with FIG. 6H.

Figure 6H:
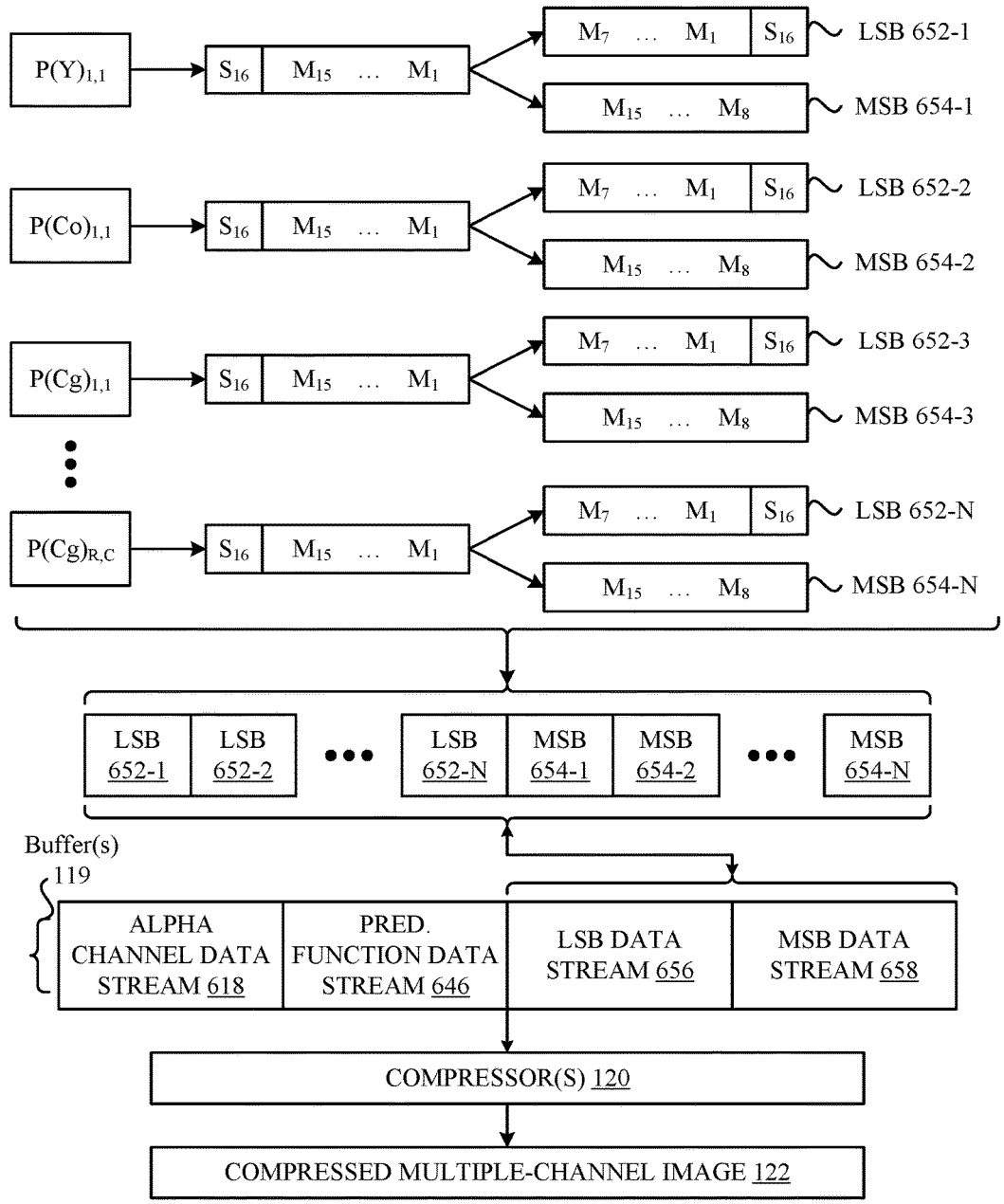

As shown in FIG. 6H, a final step 609 can involve the encoder 118 separating the prediction differentials 640—specifically, the bits of each of prediction differential 640—into a least significant byte 652 and a most significant byte 654. For example, as shown in FIG. 6H, the prediction differential 640 for the luma value Y (of the sub-pixel 616 (1,1))—which includes (1) a sign bit (S16) established by way of the predictive functions 642 (applied at step 607 of FIG. 6F), and (2) up to fifteen magnitude bits (M15-M1) (i.e., the prediction differential 640 itself)—can be separated into a least significant byte 652-1 and a most significant byte 654-1. In particular, the sign bit (S16) can be positioned within a least significant bit of the least significant byte 652, followed by seven of the least significant magnitude bits (M7-M1). Additionally, eight of the most significant magnitude bits (M15-M8) can be positioned within the most significant byte 654-1.

Additionally, as shown in FIG. 6H, the prediction differential 640 for the chroma value CO (of the sub-pixel 616 (1,1))—which includes (1) a sign bit (S16) established by way of the predictive functions 642 (applied at step 607 of FIG. 6F), and (2) up to fifteen magnitude bits (M15-M1) (i.e., (i) the first sign bit established by the color space transformation functions 622 (applied at step 220 of FIG. 6B), and (ii) the prediction differential 640 itself)—can be separated into a least significant byte 652-2 and a most significant byte 654-2. Similarly, the prediction differential 640 for the chroma value CG (of the sub-pixel 616 (1,1))—which includes (1) the sign bit (S16) established by way of the predictive functions 642 (applied at step 607 of FIG. 6F), and (2) up to fifteen magnitude bits (M15-M1) (i.e., (i) the first sign bit established by the color space transformation functions 622 (applied at step 220 of FIG. 6B), and (ii) the prediction differential 640 itself)—can be separated into a least significant byte 652-3 and a most significant byte 654-3.

It is noted that the encoder 118 can perform the foregoing techniques using a variety of approaches, e.g., performing in-place modifications if the prediction differentials 640 (and ordered according to the distribution illustrated in FIG. 6G), copying the prediction differentials 640 into respective data structures for the least significant bytes 652 and the most significant bytes 654 (and ordered according to the distribution illustrated in FIG. 6G), and so on. It is also noted that the distributions illustrated in FIG. 6H and described herein are exemplary, and that any distribution of the bits of the prediction differentials 640 can be utilized without departing from the scope of this disclosure.

In any case, when the encoder 118 establishes the least significant bytes 652 and the most significant bytes 654 for each of the prediction differentials 640, the encoder 118 can group the least significant bytes 652 into a least significant byte data stream 656 (e.g., in a left to right (i.e., row-wise)/top down (i.e., column-wise) order). Similarly, the encoder 118 can group the most significant bytes 654 into a most significant bye data stream 658 (e.g., in a left to right (i.e., row-wise)/top down (i.e., column-wise) order). At this juncture, four data streams have been established: the alpha channel data stream 618, the predictive function data stream 644, the least significant byte data stream 656, and the most significant byte data stream 658. In turn, the encoder 118 can provide these data streams into the buffer(s) 119, and invoke the compressor(s) 120 to compress the buffer(s) 119. Subsequently, the compressor(s) 120 can take action and compress the contents of the buffer(s) 119 to produce a compressed output. In this manner, the compressed outputs can be joined together to produce a compressed multiple-channel image 122.

Figure 7A:
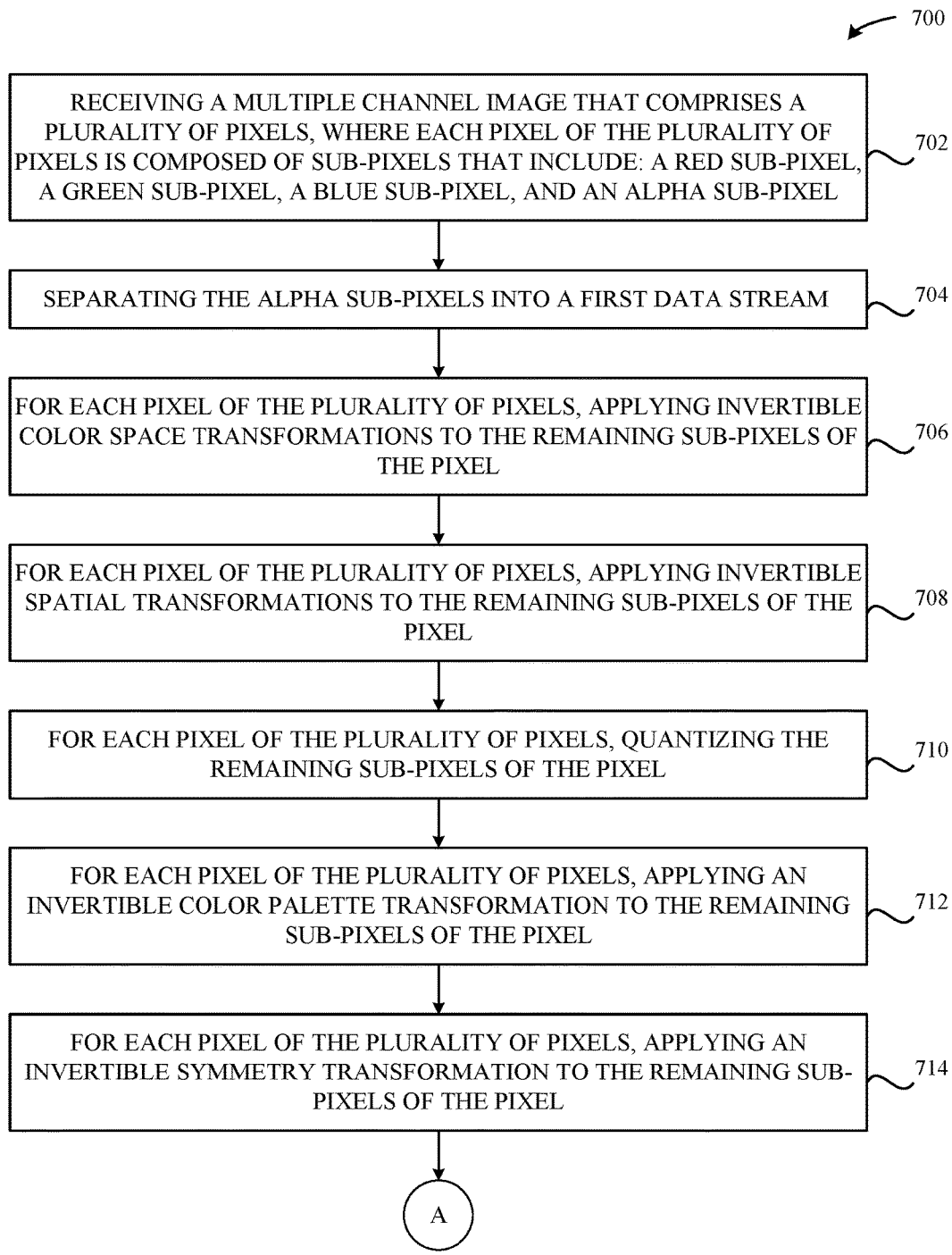
FIGS. 7A-7B illustrate a method for the expanded approach for pre-processing a multiple-channel image for compression, according to some embodiments.
Figure 7B:
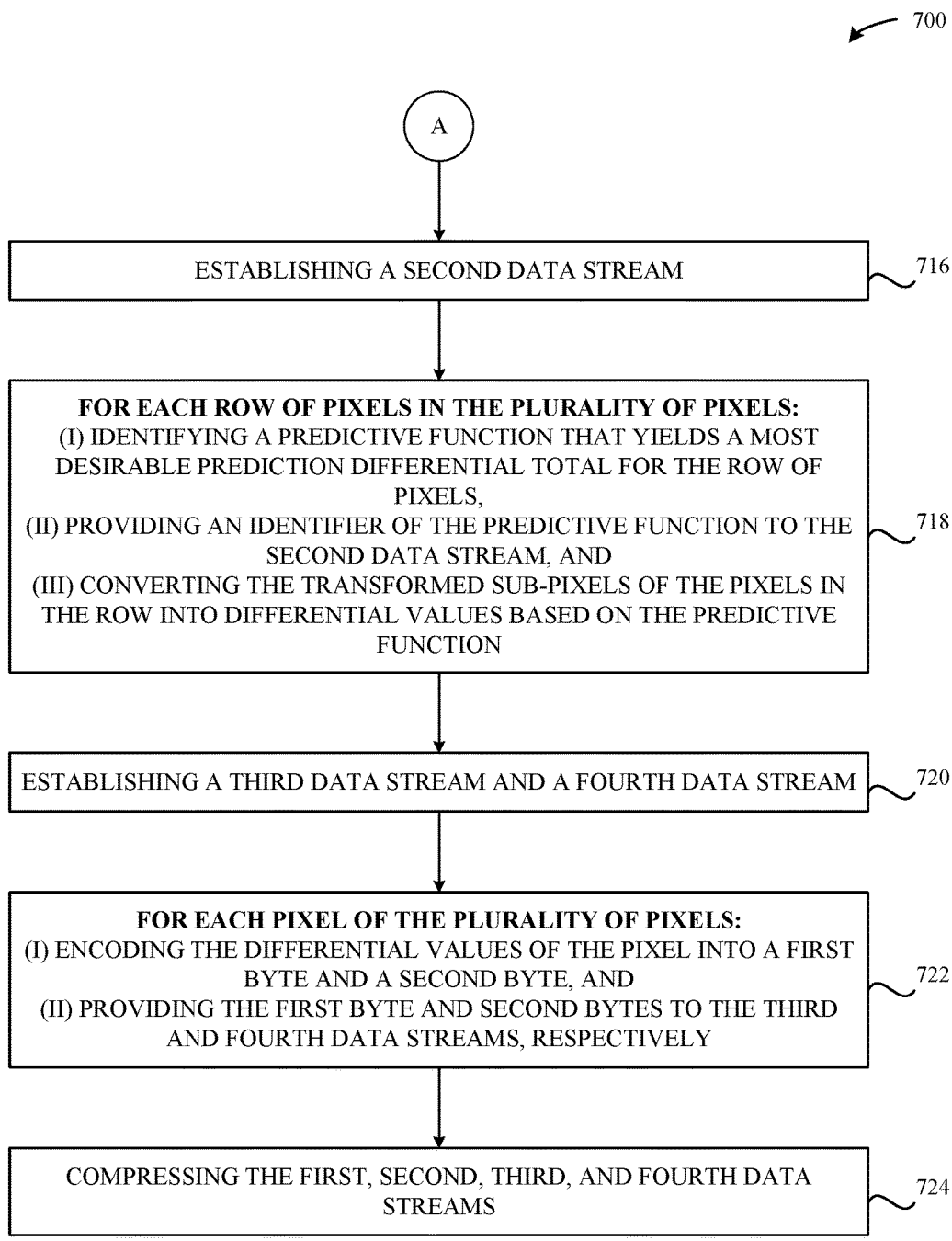

FIGS. 7A-7B illustrate a method 700 for the expanded approach for pre-processing a multiple-channel image 108 for compression, according to some embodiments. As shown in FIG. 7A, the method 700 begins at step 702, where the image analyzer 110 receives image data for the multiple-channel image 108. As described herein, the image data can be composed of a plurality of pixels 614, where each pixel 614 of the plurality of pixels 614 is composed of sub-pixels 616 that include: a red sub-pixel 616, a green sub-pixel 616, a blue sub-pixel 616, and an alpha sub-pixel 616 (e.g., as described above in conjunction with FIG. 6A).

At step 704, the image analyzer 110 separates the alpha sub-pixels 616 into a first data stream (e.g., the alpha channel data stream 618 described above in conjunction with FIG. 6A). At step 706, the image analyzer 110 applies, for each pixel 614 of the plurality of pixels 614, invertible transformations (e.g., the transformation functions 622 described above in conjunction with FIG. 6B) to the remaining sub-pixels 616 of the pixel 614 to produce transformed sub-pixels (e.g., the sub-pixels 624 described above in conjunction with FIG. 6B).

At step 708, the image analyzer 110 applies, for each pixel 614 of the plurality of pixels 614, invertible spatial transformations (e.g., the transformation functions 626 described above in conjunction with FIG. 6C) to the remaining sub-pixels 616 of the pixel 614 to produce updated sub-pixels (e.g., the sub-pixels 628 described above in conjunction with FIG. 6C).

At step 710, the image analyzer 110, for each pixel 614 of the plurality of pixels 614, quantizes the remaining sub-pixels 616 of the pixel 614 (e.g., the quantization adjustments 630 described above in conjunction with FIG. 6D) to produce updated sub-pixels (e.g., the sub-pixels 632 described above in conjunction with FIG. 6D).

At step 712, the image analyzer 110 applies, for each pixel 614 of the plurality of pixels 614, an invertible color palette transformation to the remaining sub-pixels 616 of the pixel 614 (e.g., step 605 described above in conjunction with FIG. 6E) to produce updated sub-pixels (e.g., the sub-pixels 634 described above in conjunction with FIG. 6E).

At step 714, the image analyzer 110 applies, for each pixel 614 of the plurality of pixels 614, an invertible symmetry transformation to the remaining sub-pixels 616 of the pixel 614 (e.g., step 606 described above in conjunction with FIG. 6E) to produce updated sub-pixels (e.g., the sub-pixels 636 described above in conjunction with FIG. 6E).

Turning now to FIG. 7B, at step 716, the image analyzer 110 establishes a second data stream (e.g., the predictive functions data stream 646 described above in conjunction with FIG. 6G). At step 718, the image analyzer 110 performs the following for each row of pixels 614 in the plurality of pixels 614: (i) identifying a predictive function (e.g., a predictive function 642, as described above in conjunction with FIG. 6F) that yields a most desirable prediction differential total for the row of pixels 614 (e.g., as described above in conjunction with FIG. 6F), (ii) providing an identifier of the predictive function 642 to the second data stream (e.g., as described above in conjunction with FIG. 6G), and (iii) converting the sub-pixels 636 of the pixels in the row of pixels 614 into prediction differentials 640 based on the predictive function 642 (e.g., as described above in conjunction with FIGS. 6F-6G).

At step 720, the image analyzer 110 establishes a third data stream and a fourth data stream (e.g., the least significant byte data stream 656 and the most significant byte data stream 658, as described above in conjunction with FIG. 6H). At step 722, the image analyzer 110 performs the following for each pixel 614 of the plurality of pixels 614: (i) encoding the prediction differentials 640 of the pixel 614 into a first byte and a second byte (e.g., as described above in conjunction with FIG. 6H), and (ii) providing the first byte and second bytes to the third and fourth data streams, respectively (e.g., as described above in conjunction with FIG. 6H). Finally, at step 724, the image analyzer 110 compresses the first, second, third, and fourth data streams (e.g., as described above in conjunction with FIG. 6H) using the compressor(s) 120.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for pre-processing a multiple-channel image for compression, the method comprising, at a computing device:
receiving the multiple-channel image, wherein the multiple-channel image comprises a plurality of pixels, and each pixel of the plurality of pixels is composed of sub-pixels that include at least an alpha sub-pixel;
separating the alpha sub-pixels into a first data stream;
for each pixel of the plurality of pixels, producing transformed sub-pixels by applying, to the remaining sub-pixels, two or more transformations;
for each row of pixels in the plurality of pixels:
converting the transformed sub-pixels of the pixels in the row into prediction differentials based on a predictive function that yields a lowest prediction differential total for the row of pixels, and
encoding the prediction differentials of the pixel into a second data stream; and
compressing the first and second data streams.

2. The method of claim 1, wherein the two or more transformations comprise at least an invertible transformation, and applying the invertible transformation to the sub-pixels of a pixel of the plurality of pixels produces an equal number of transformed sub-pixels.

3. The method of claim 1, wherein the sub-pixels of each pixel of the plurality of pixels further include: red sub-pixel, a green sub-pixel, and a blue sub-pixel.

4. The method of claim 3, wherein:
applying a first invertible transformation to the green sub-pixel comprises:
subtracting the blue sub-pixel from the red sub-pixel to produce a first transformed sub-pixel, and
replacing the green sub-pixel with the first transformed sub-pixel; and
applying a second invertible transformation to the blue sub-pixel comprises:
adding the blue sub-pixel to half of the first transformed sub-pixel to produce a temporary value, and
replacing the blue sub-pixel with a second transformed sub-pixel that is equal to the temporary value subtracted from the green sub-pixel.

5. The method of claim 4, further comprising:
adding a respective sign bit to each of the first and the second transformed sub-pixel.

6. The method of claim 4, wherein applying a third invertible transformation to the red sub-pixel comprises:
replacing the red sub-pixel with a third transformed sub-pixel value that is equal to the temporary value added to half of the second transformed sub-pixel.

7. The method of claim 1, wherein the two or more transformations comprise:
an invertible color space transformation,
an invertible spatial transformation,
a quantization transformation,
an invertible color palette transformation, and
an invertible symmetry transformation.

8. At least one non-transitory computer readable storage medium configured to store instructions that, when executed by a processor included in a computing device, cause the computing device to pre-process a multiple-channel image for compression, by carrying out steps that include:
receiving the multiple-channel image, wherein the multiple-channel image comprises a plurality of pixels, and each pixel of the plurality of pixels is composed of sub-pixels that include at least an alpha sub-pixel;
separating the alpha sub-pixels into a first data stream;

for each pixel of the plurality of pixels, producing transformed sub-pixels by applying, to the remaining sub-pixels, two or more transformations;

for each row of pixels in the plurality of pixels:
converting the transformed sub-pixels of the pixels in the row into prediction differentials based on a predictive function that yields a lowest prediction differential total for the row of pixels, and
encoding the prediction differentials of the pixel into a second data stream; and
compressing the first and second data streams.

9. The at least one non-transitory computer readable storage medium of claim 8, wherein the two or more transformations comprise at least an invertible transformation, and applying the invertible transformation to the sub-pixels of a pixel of the plurality of pixels produces an equal number of transformed sub-pixels.

10. The at least one non-transitory computer readable storage medium of claim 8, wherein the sub-pixels of each pixel of the plurality of pixels further include: red sub-pixel, a green sub-pixel, and a blue sub-pixel.

11. The at least one non-transitory computer readable storage medium of claim 10, wherein:
applying a first invertible transformation to the green sub-pixel comprises:
subtracting the blue sub-pixel from the red sub-pixel to produce a first transformed sub-pixel, and
replacing the green sub-pixel with the first transformed sub-pixel; and
applying a second invertible transformation to the blue sub-pixel comprises:
adding the blue sub-pixel to half of the first transformed sub-pixel to produce a temporary value, and
replacing the blue sub-pixel with a second transformed sub-pixel that is equal to the temporary value subtracted from the green sub-pixel.

12. The at least one non-transitory computer readable storage medium of claim 11, wherein the steps further include:
adding a respective sign bit to each of the first and the second transformed sub-pixel.

13. The at least one non-transitory computer readable storage medium of claim 11, wherein applying a third invertible transformation to the red sub-pixel comprises:
replacing the red sub-pixel with a third transformed sub-pixel value that is equal to the temporary value added to half of the second transformed sub-pixel.

14. The at least one non-transitory computer readable storage medium of claim 8, wherein the two or more transformations comprise:
an invertible color space transformation,
an invertible spatial transformation,
a quantization transformation,
an invertible color palette transformation, and
an invertible symmetry transformation.

15. A computing device configured to pre-process a multiple-channel image for compression, the computing device comprising:

at least one processor; and
at least one memory configured to store instructions that, when executed by the at least one processor, cause the computing device to:
receive the multiple-channel image, wherein the multiple-channel image comprises a plurality of pixels, and each pixel of the plurality of pixels is composed of sub-pixels that include at least an alpha sub-pixel;
separate the alpha sub-pixels into a first data stream;
for each pixel of the plurality of pixels, produce transformed sub-pixels by applying, to the remaining sub-pixels, two or more transformations;
for each row of pixels in the plurality of pixels:
convert the transformed sub-pixels of the pixels in the row into prediction differentials based on a predictive function that yields a lowest prediction differential total for the row of pixels, and
encode the prediction differentials of the pixel into a second data stream; and
compress the first and second data streams.

16. The computing device of claim 15, wherein the two or more transformations comprise at least an invertible transformation, and applying the invertible transformation to the sub-pixels of a pixel of the plurality of pixels produces an equal number of transformed sub-pixels.

17. The computing device of claim 15, wherein the sub-pixels of each pixel of the plurality of pixels further include: red sub-pixel, a green sub-pixel, and a blue sub-pixel.

18. The computing device of claim 17, wherein:
applying a first invertible transformation to the green sub-pixel comprises:
subtracting the blue sub-pixel from the red sub-pixel to produce a first transformed sub-pixel, and
replacing the green sub-pixel with the first transformed sub-pixel; and
applying a second invertible transformation to the blue sub-pixel comprises:
adding the blue sub-pixel to half of the first transformed sub-pixel to produce a temporary value, and
replacing the blue sub-pixel with a second transformed sub-pixel that is equal to the temporary value subtracted from the green sub-pixel.

19. The computing device of claim 18, wherein the at least one processor further causes the computing device to:
add a respective sign bit to each of the first and the second transformed sub-pixel.

20. The computing device of claim 15, wherein the two or more transformations comprise:
an invertible color space transformation,
an invertible spatial transformation,
a quantization transformation,
an invertible color palette transformation, and
an invertible symmetry transformation.

* * * * *